(12) United States Patent
Cochran et al.

(10) Patent No.: US 6,517,297 B2
(45) Date of Patent: Feb. 11, 2003

(54) CHUCK AND ASSEMBLY WITH BIT

(75) Inventors: John R. Cochran, Baltimore, MD (US); Michael L. Obanion, Westminster, MD (US); Allen P. Smith, Baltimore, MD (US)

(73) Assignee: Black & Decker Inc., Newark, DE (US)

( * ) Notice: Subject to any disclaimer, the term of this patent is extended or adjusted under 35 U.S.C. 154(b) by 65 days.

(21) Appl. No.: 09/779,640

(22) Filed: Feb. 9, 2001

(65) Prior Publication Data

US 2001/0046421 A1 Nov. 29, 2001

Related U.S. Application Data

(60) Provisional application No. 60/182,204, filed on Feb. 14, 2000.

(51) Int. Cl.[7] .............................................. B23B 31/107
(52) U.S. Cl. ........................... 408/226; 279/30; 279/75; 279/904; 408/240
(58) Field of Search ............................... 408/226, 239 R, 408/240; 279/19.6, 19.5, 19.4, 22, 30, 29, 57, 74, 75, 80, 82, 906, 904

(56) References Cited

U.S. PATENT DOCUMENTS

| | | | | |
|---|---|---|---|---|
| 922,936 A | * | 5/1909 | Miller | 279/82 |
| 943,863 A | * | 12/1909 | Clouse | 279/79 |
| 1,056,076 A | * | 3/1913 | Wiard | 279/75 |
| 1,174,997 A | * | 3/1916 | Lackner | 279/74 |
| 1,862,623 A | | 6/1932 | Harrington | |
| 4,107,949 A | | 8/1978 | Wanner et al. | |
| 4,629,375 A | | 12/1986 | Lieser | |
| 5,016,892 A | | 5/1991 | Lafforgue et al. | |
| 5,340,245 A | | 8/1994 | Bloechle et al. | |
| 5,558,478 A | | 9/1996 | Odendahl et al. | |

* cited by examiner

*Primary Examiner*—Daniel W. Howell
(74) *Attorney, Agent, or Firm*—Charles E. Yocum; John D. Del Ponti

(57) ABSTRACT

A chuck 30,232 includes a pair of jaws 178,304,306 which are located within an axial opening 114,246 of a body 106,234 for receipt of a shank of a bit therein. A roller 186,238 is located in a slot 134,272 of the body 106,234 and can be pressed into the shank of the bit to clamp the shank between the jaws 178,304,306 and the roller. A sleeve 196,240 is biased and structured to normally urge the roller 186,238 into the shank-pressing position, and is movable relative to the body 106,234 to facilitate removal of the shank from the chuck 30,232.

57 Claims, 18 Drawing Sheets

CHUCK AND ASSEMBLY WITH BIT

This application claims the benefit of Provisional Application No. 60/182,204, filed Feb. 14, 2000.

BACKGROUND OF THE INVENTION

This invention relates to a chuck assembly with a bit, and particularly to the structure of the chuck, and the structure of the assembled chuck and bit.

For many years, chucks have been used to grip or mount bits for a variety of purposes, including the mounting of rotary bits for use with a hand or power tool. In many instances, chucks have included a plurality of movable bit-engaging jaws mounted within an opening of a chuck body. The jaws can be manipulated to clamp the shank of a bit which has been inserted into the opening of the chuck. In this manner, the bit is retained with the chuck which, in turn, is mounted on the hand or power tool. The jaws of such chucks may be operated by use of an external implement, such as a conventional chuck key, or by rotational elements on the chuck.

Other chucks of the past were designed to allow the bit to be inserted directly into the opening of the chuck using a direct-insertion mounting technique, whereby the bit is locked in assembly with the chuck by virtue of structure within a body of the chuck and on the bit.

While some of the above-noted chucks are adapted to receive and mount bits by insertion of the bits directly into the bit-receiving opening of the chuck, the opening is typically designed to receive only shanks of bits with a common diameter or size, consistent with the diameter or size of the opening. Thus, a set of bits of different diameters at the working ends thereof would each be required to have a chuck-mounting shank diameter which is the same as the shank diameter of the remaining bits of the set. This leads to a situation where the bit shank, in order to be strong enough to handle the forces and torques imposed on the larger bits of a range of sizes employed, is much larger than needed, and thus uneconomical, for the smallest bits of the set.

Thus, there is a need for a chuck having structure which will facilitate use of the direct-insertion mounting technique for bits having different shank diameters.

In addition, there is a need for a chuck and bit assembly having structure which facilitates use of the direct-insertion mounting technique where the parameters of the chuck structure are constant and the parameters of the structure of the bits fluctuates.

SUMMARY OF THE INVENTION

It is, therefore, an object of this invention to provide a chuck having consistent structure which will facilitate use of a direct-insertion mounting technique for bits having different chuck-mounting shank diameters.

Another object of this invention is to provide a chuck and bit assembly, each having structure which facilitates use of a direct-insertion mounting technique where parameters of the structure of the chuck are constant and parameters of the structure of the bits fluctuates.

With these and other objects in mind, this invention contemplates a chuck for receiving and supporting a bit, which includes a body formed along an axis thereof having an axial opening accessible from a forward end of the body for receipt of a shank of the bit. A radial passage is formed in the body in communication with the axial opening within the body. A limit surface is formed on the body adjacent the radial passage, and a compression member is located movably within the radial passage and has at least a portion which is extendable from the radial passage into the axial opening. A support extends from the compression member and is positioned for engagement with the limit surface to limit the extent of movement of the at least a portion of the compression member into the axial opening.

This invention further contemplates a chuck for receiving and supporting a bit, which includes a body formed along an axis thereof and having an axial opening for receipt of a shank of the bit, with the opening being accessible from a forward end of the body. A compression member is located movably in the body and has at least a portion which is extendable into the axial opening. A nosepiece is attached to the forward end of the body. At least one jaw extends from a rear face of the nosepiece in a direction axially toward a rear end of the body and is located in the opening of the body.

In another aspect, this invention contemplates a chuck and bit assembly, wherein the chuck includes a body formed along an axis thereof and having an axial opening for receipt of a shank of the bit, with the opening being accessible from a forward end of the body. A jaw is located within the opening of the body in an axial direction thereof. A radial passage is formed in the body in communication with the axial opening within the body. A limit surface is formed on the body adjacent the radial passage, and a compression member is located movably within the radial passage and has at least an extendable portion which is extendable into the axial opening. A support extends from the compression member and is positioned for engagement with the limit surface to limit the extent of movement of the extendable portion of the compression member into the axial opening. Means are provided for urging the extendable portion of the compression member toward the axis of the body. A bit includes a chuck-mountable shank formed along an axis thereof wherein the shank is formed with spaced exterior surface areas positionable adjacent the extendable portion of the compression member and the at least one jaw upon positioning of the shank within the axial opening of the body. The means for urging then facilitates the clamping of the shank between the compression member and the jaw.

Other objects, features and advantages of the present invention will become more fully apparent from the following detailed description of the preferred embodiment, the appended claims and the accompanying drawings.

DETAILED DESCRIPTION OF THE PREFERRED EMBODIMENT

Figure 1:
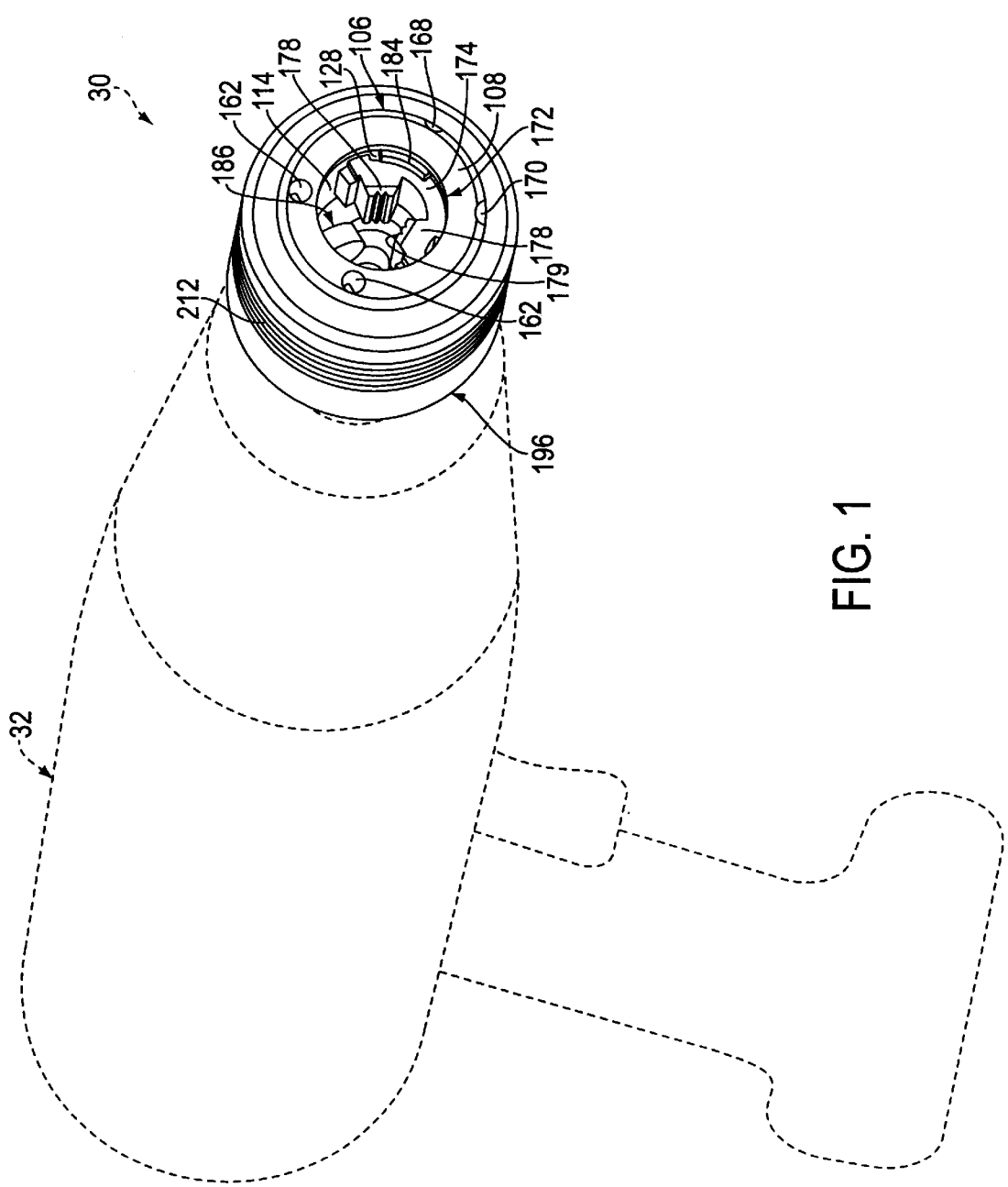
FIG. 1 is a perspective view showing a first embodiment of a chuck, in accordance with certain principles of the invention, mounted on a power drill.
Figure 6:
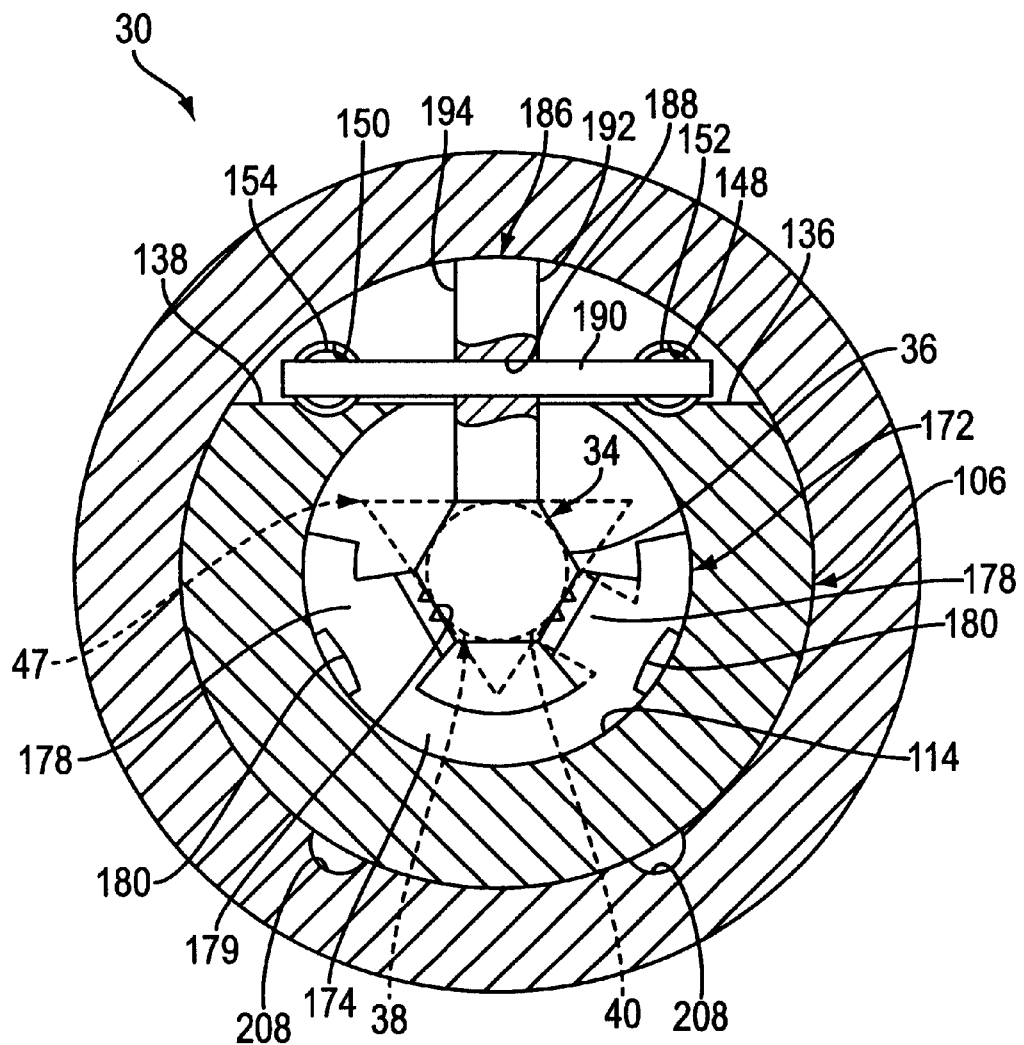
FIG. 6 is a sectional view showing the chuck of FIGS. 1 and 5 in accordance with certain principles of the invention.

Referring to FIG. 1, one embodiment of a chuck 30 can be coupled to a power driver such as, for example, a drill 32, shown in phantom, for rotating the chuck. As shown in FIG. 6, the chuck 30 is designed to receive and grip differently configured shanks of a plurality of bits, including a hex bit 34 having a hex shank 36 with a hexagonal cross section, and a round bit 38 having a round shank 40 with a round cross section, where the dimension between opposed flats of the hex shank is generally equal to the diameter of the round shank. The chuck 30 can also receive bits having different shank configurations such as, for example, a grooved bits 42 (FIG. 2), 44 (FIG. 3) and 46 (FIG. 4), all having grooved shanks.

Figure 23:
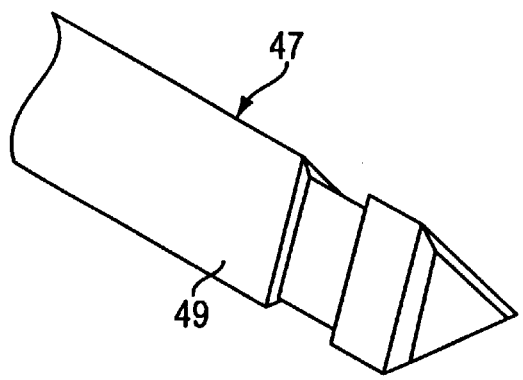
FIG. 23 is a perspective view showing a shank of a bit having a triangular cross section.

The chuck 30 may also receive and grip triangular bits 47 having a triangular shank 49 (FIGS. 6 and 23) with a triangular cross section, such as bits shown and described in copending U.S. Application No. 60/144,825, filed on Jul. 21, 1999, the disclosure of which is incorporated herein by reference thereto.

Figure 2:
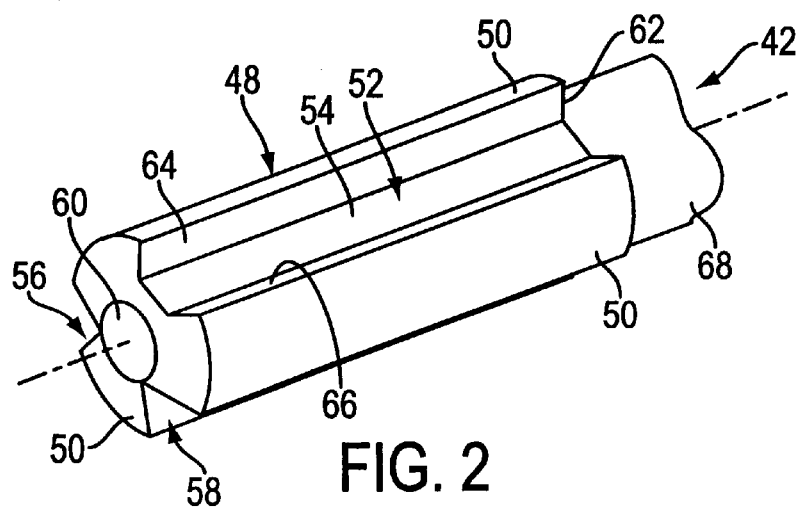
FIGS. 2, 3 and 4 are perspective views showing a various bits having chuck-mountable round shanks and formed with variously configured annular grooves.

As shown in FIG. 2, the bit 42 is formed with a chuck-mountable shank 48 along an axis thereof, having a round cross section, and extend axially from an outboard end 60, or free end, of the shank toward an intermediate portion of the bit. The round shank 48 is formed axially with angularly spaced ribs 50, which define an outer surface of the shank, and one groove 52 formed with a flat floor 54 of a prescribed width. The shank 48 is also formed axially with two grooves 56 and 58, either or both of which could be configured differently from, or the same as, the groove 52. As shown in FIG. 2, the grooves 56 and 58 are formed, for example, as "V" shaped grooves. Each of the grooves 52, 56 and 58 are located between an adjacent pair of the ribs 50, and the grooves and ribs are parallel in an axial direction. Each of the grooves 52, 56 and 58 are open at an outboard end 60, or free end, of the shank 48, and at an inboard end 62 of the grooves as shown with respect to the groove 52. However, any of the grooves 52, 56 and 58 could be closed at the inboard end thereof, such as, for example, at the inboard end 62 of the groove 52, or toward the intermediate portion of the bit, without departing from the spirit and scope of the invention.

The groove 52 is formed with spaced side walls 64 and 66, which diverge as the side walls extend generally radially outward from junctures of the side walls with respective opposite edges of the flat floor 54 of the groove 52. A working section 68 of the bit 42 extends axially from the shank 48, and is formed with a diameter which is less than the diameter of the shank. The floor 54 and the spaced side walls 64 and 66 of the groove 52 are formed with a prescribed cross sectional groove structure and with a prescribed groove depth.

Figure 3:
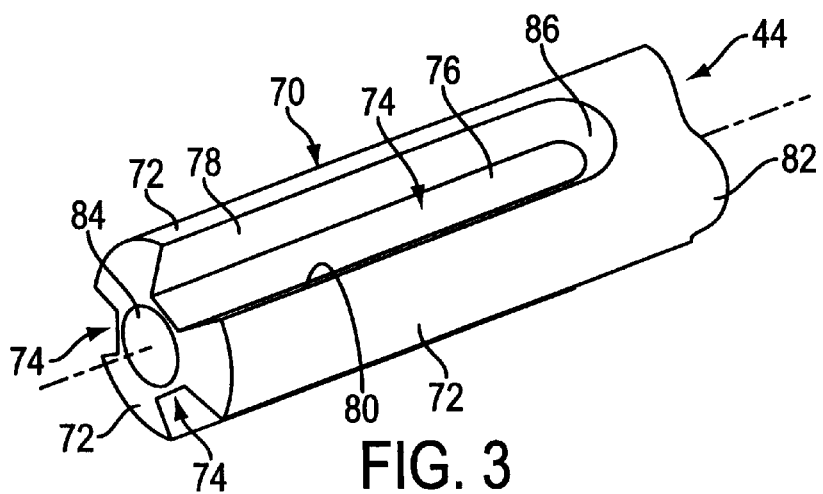

As shown in FIG. 3, the bit 44 is formed with a chuck-mountable shank 70 along an axis thereof, having a round cross section, and extend axially from an outboard end, or free end, of the shank toward an intermediate portion of the bit. The round shank 70 is formed axially with three angularly spaced ribs 72, which define the outer surface of the shank, and three, angularly spaced, axially-directed grooves 74, each of which is formed with a flat floor 76 of a prescribed width. Each of the grooves 74 is located between a respective adjacent pair of the ribs 72. Each the grooves 74 is formed with spaced side walls 78 and 80, which diverge as the side walls extend generally radially outward from junctures of the side walls with respective opposite edges of the flat floor 76. A working section 82 of the bit 44 extends axially from the shank 70 with a diameter which is substantially equal to the diameter of the shank. Each of the grooves 74 is open at an outboard end 84, or free end, of the shank 70, and is closed at an inboard end 86 of the groove. The floor 76 and the side walls 78 and 80 of each of the grooves 74 are formed with a prescribed cross sectional groove structure and with a prescribed groove depth.

Figure 4:
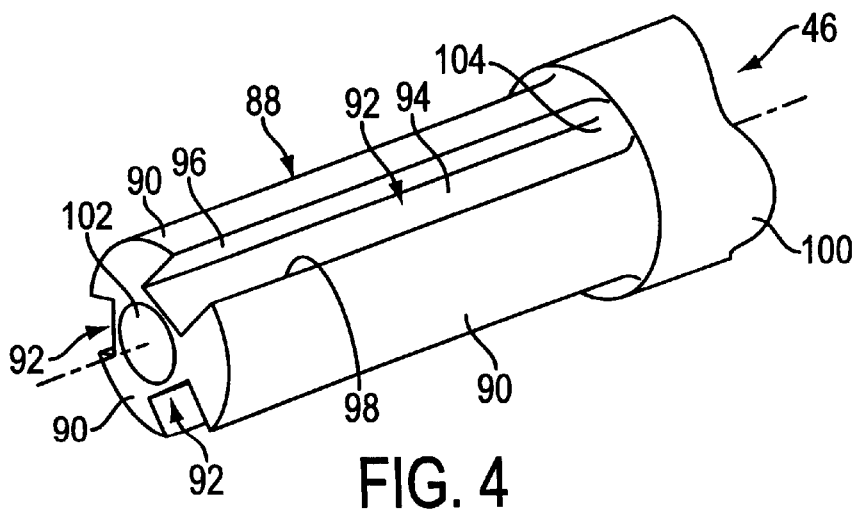

As shown in FIG. 4, the bit 46 is formed with a chuck-mountable shank 88 along an axis thereof, having a round cross section, and extending axially from an outboard end 102, or free end, of the shank toward an intermediate portion of the bit. The round shank 88 is formed axially with three, angularly spaced, axially-directed ribs 90, which define the outer surface of the shank, and three, angularly spaced, axially-directed grooves 92, each of which is formed with a flat floor 94 of a prescribed width. Each of the grooves 92 is located between a respective adjacent pair of the ribs 90. Each the grooves 92 is formed with spaced side walls 96 and 98, which are parallel to each other, and which extend generally perpendicularly outward from junctures of the side walls with respective opposite edges of the flat floor 94. A working section 100 of the bit 46 extends axially from the shank 88 with a diameter which is greater than the diameter of the shank. Each of the grooves 92 is open at an outboard end 102, or free end, of the shank 88, and is closed at an inboard end 104 of the groove. The floor 94 and the side walls 96 and 98 of each of the grooves 92 are formed with a prescribed cross sectional groove structure and with a prescribed groove depth.

Thus, the bits 42, 44 and 46 are each formed with a shank which includes at least a first axially extending groove and a second axially extending groove, which are spaced circumferentially about the shank. Further, the prescribed groove depth of each of the bits 42, 44, and 46 is defined by the difference between (1) the radial distance between the axis of the bit and the floor of the grooves formed in the shank thereof, and (2) the radius of the respective shank Bits, such as the above-described bits 42, 44 and 46, are described in copending U.S. application Ser. No. 09/439, 505, filed on Nov. 12, 1999, the disclosure of which is incorporated herein by reference thereto.

Figure 5:
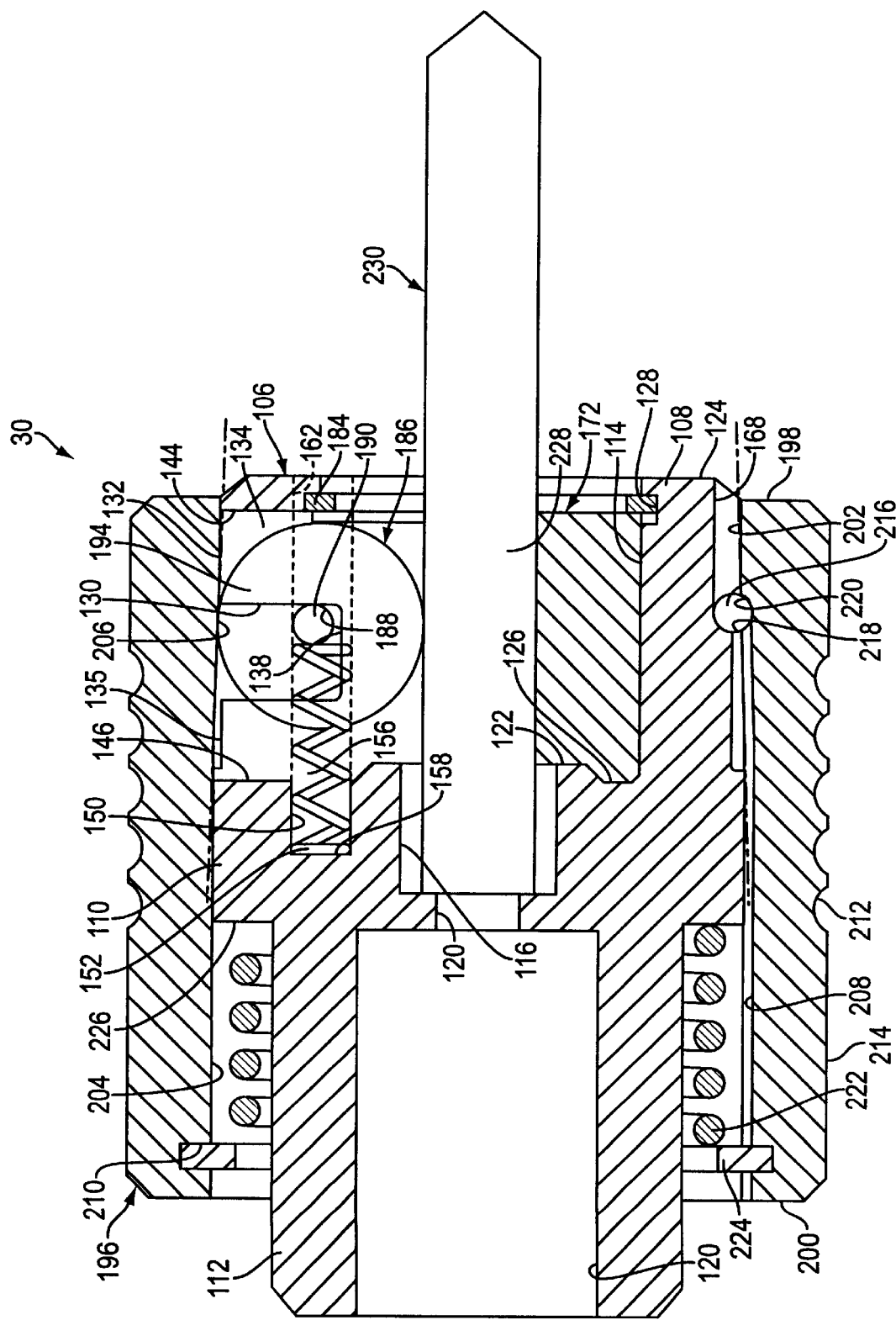
FIG. 5 is a sectional view showing the chuck of FIG. 1, in accordance with certain principles of the invention.

Referring to FIG. 5, the chuck 30 includes a central body 106, which is also shown in detail in FIGS. 7, 8, 9 and 10. Specifically, the body 106 is formed with a forward cylindrical section 108, which has a first prescribed exterior diameter. The body 106 is also formed with an intermediate cylindrical section 110, which has a second prescribed exterior diameter greater than the first prescribed diameter. Further, the body 106 is formed with a rear cylindrical section 112, which has a third prescribed exterior diameter smaller than the first and second prescribed diameters.

Figure 7:
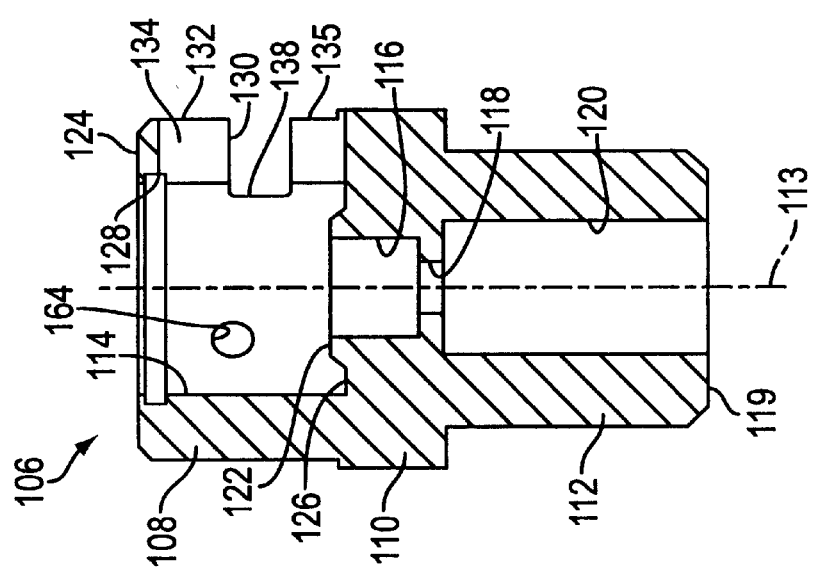
FIG. 7 is a sectional view showing a body of the chuck of FIGS. 1, 5 and 6, in accordance with certain principles of the invention.

As shown in FIG. 7, the body 106 is formed along an axis 113 thereof and includes the forward section 108 which is formed with an axial opening or bore 114, accessible from a forward end 124 of the body. The intermediate section 110 is formed with a counter bore having a large-diameter axial bore 116 in a forward portion of the counterbore, and a small-diameter axial bore 118 in a rear portion of the counterbore. The rear section 112 of the body 106, which extends to a rear end 119 of the body, is formed with a bore 120 which has a diameter greater than the diameters of the bores 116 and 118, but less than the diameter of the bore 114. The bore 120 can be threaded for receipt of a threaded spindle (not shown) which extends from a forward end of the drill 32. The bores 114, 116, 118 and 120 are aligned axially, and are in communication with each other. A circular mesa 122 is formed about the forward opening of the bore 116 and extends toward a forward end 124 of the body 106. A circular pocket 126 is formed between the side wall of the mesa 122 and the wall of the bore 114. An annular groove 128 is formed in the wall of the bore 114 adjacent the forward end 124 of the body 106.

Figure 8:
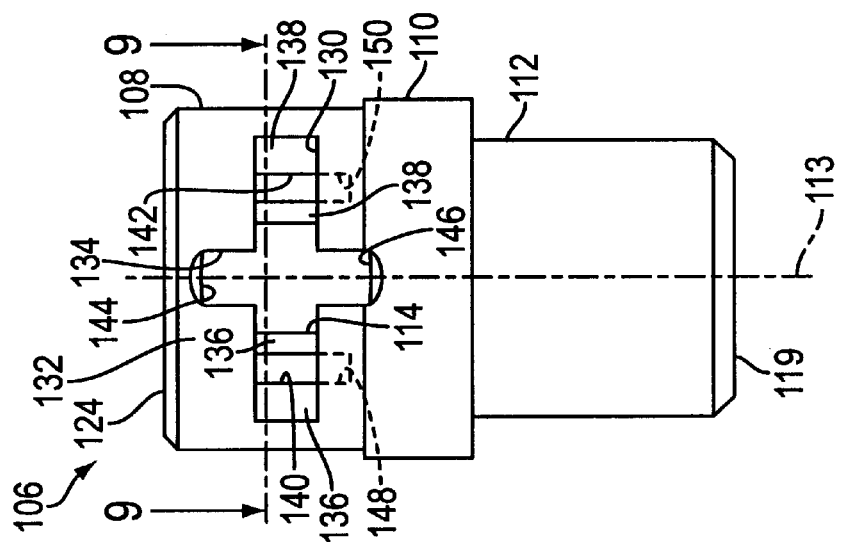
FIG. 8 is a side view showing the body of FIG. 7, in accordance with certain principles of the invention.
Figure 9:
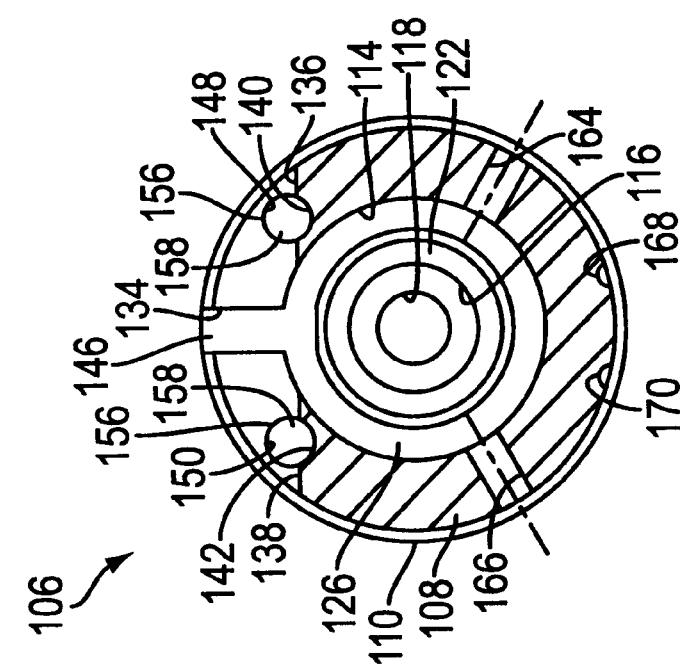
FIG. 9 is a sectional view showing the body of FIG. 7, in accordance with certain principles of the invention.

As shown in FIG. 8, a first slot 130, or circumferential passage, is formed in a first exterior surface portion 132 of the forward section 108 of the body 106, and is transverse to the axis 113 of the body. A second slot 134, or radial passage, is formed in an axial direction in the first exterior surface portion 132 of the forward section 108 of the body 106, and is parallel to the axis 113 of the body. The slots 130 and 134 are arranged in a cross pattern and, as shown in FIGS. 7, 8 and 9, are in communication with each other and with the bore 114. As shown in FIGS. 5 and 7, the outer surface of the body 106 is formed with a clearance shelf 135, forward and rearward of the slot 130, which is slightly less in distance from the axis 113 than the outer periphery of the intermediate section 110 of the body.

As shown in FIGS. 8 and 9, a pair of spaced shelves 136 and 138, or limit surfaces, are located in a common plane, and are formed on transaxially spaced sides of a base of the slot 130. The shelves 136 and 138 are formed with grooves 140 and 142, respectively, each of which extends in an axial direction. The slot 134 is formed with a forward wall 144, adjacent the forward end 124 of the body 106, and a rearward wall 146, axially opposite the forward wall, which are spaced apart by a prescribed axial distance. Referring to FIGS. 5, 8 and 9, a pair of spaced holes 148 and 150 are formed in the body 106 to the rear of the slot 130 for eventual receipt of rear portions of a pair of springs 152 and 154 (FIG. 6), respectively, with a forward portion of the springs extending axially into the slot. Each of the holes 148 and 150 is open at a first end 156, and in communication with the slot 130, and is formed with a floor 158 at a second end spaced rearward of the body from the first end.

Figure 10:
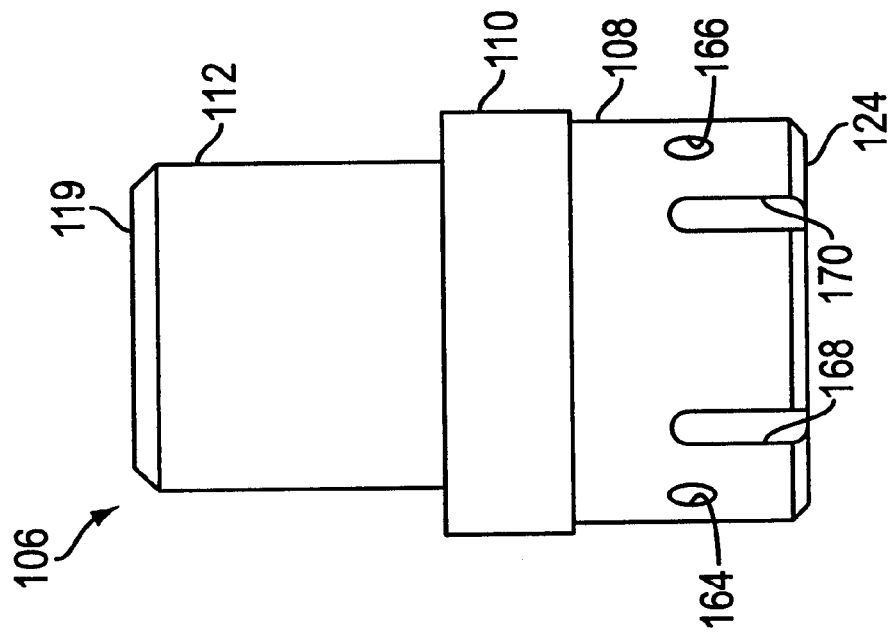
FIG. 10 is a side view showing the body of FIG. 7, in accordance with certain principles of the invention.

Referring to FIGS. 1 and 5, to facilitate insertion of the springs 152 and 154 into the respective holes 148 and 150, clearance holes 160 and 162, respectively, are formed through the forward end 124 of the body 106, in line with the respective grooves 140 and 142. As shown in FIGS. 9 and 10, a pair of radial access holes 164 and 166 are formed through the body 106 in the forward section 108, and communicate with the axial opening 114 of the body. As shown in FIGS. 5, 6, 9 and 10, a pair of axially-aligned, circumferentially spaced, bearing grooves 168 and 170 are formed in the exterior surface of the forward section 108 of the body 106.

Figure 12:
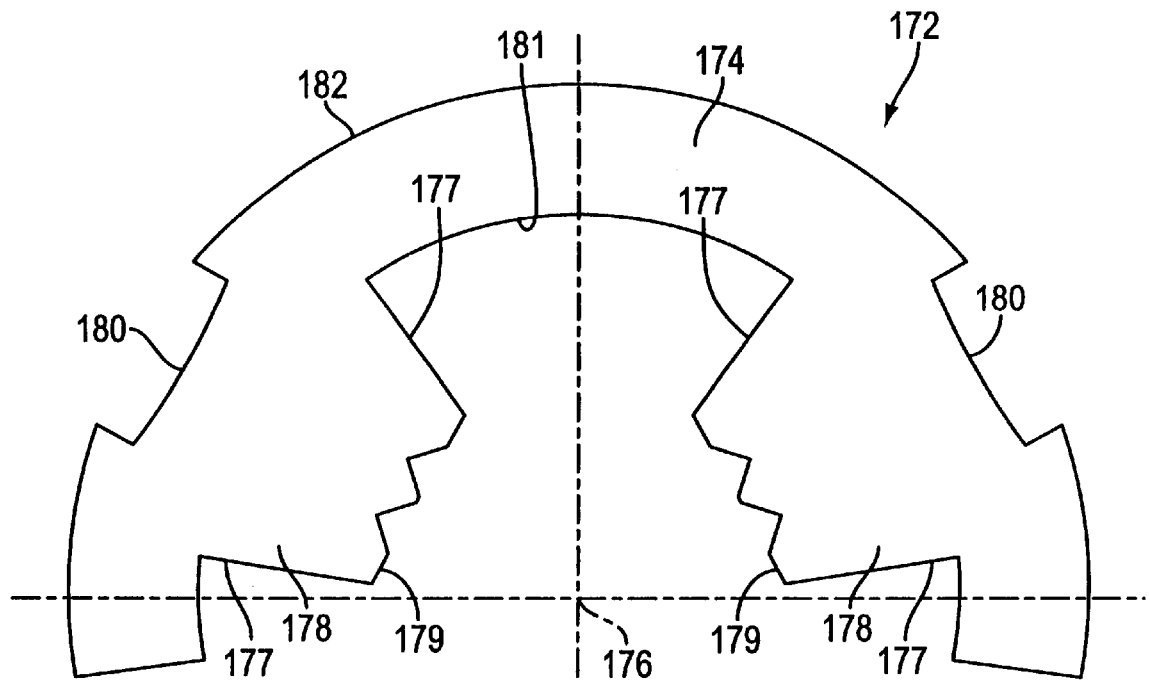
FIG. 12 is a front view showing a pair of jaws of a jaw segment which forms a component of the chuck of FIGS. 1 and 5, in accordance with certain principles of the invention.

Referring to FIG. 12, a fixed jaw segment 172 includes an arcuate band 174 which extends about an axis 176 of the segment, in an arc greater than one hundred and eighty degrees such as, for example, two hundred degrees. A pair of shank-gripping jaws 178, having opposite side walls 177 and a ridge 179, extend integrally and radially inward from the band 174, toward the axis 176 of the segment 172, and extend in an axial direction along the axis of the segment. The spaced opposite side walls 177 of each jaw 178 extend from opposite side edges of the ridge 179 to an inner wall 181 of the band 174. Except for gripping teeth formed on the ridge 179, each ridge is generally flat, as shown in FIGS. 1, 6, 12 and 13. However, the ridges 179 could be rounded, or any other suitable configuration, without departing from the spirit and scope of the invention. The pair of jaws 178 are spaced apart by approximately one hundred and twenty degrees. A pair of locking slots 180 are formed in an outer peripheral surface 182 of the fixed jaw segment 172, and are aligned with respective ones of the pair of jaws 178.

As shown in FIGS. 1 and 6, the fixed jaw segment 172 is assembled within the opening 114 of the body 106, with the jaws 178 extending radially inward toward the axis 113 (FIG. 7) of the body. Locking pins (not shown) are inserted into the access holes 164 and 166, and extend into the locking slots 180 of the fixed jaw segment 172 (FIG. 9) to preclude any rotary movement of the segment in the assembled position within the body 106. As shown in FIG. 5, a retaining ring 184 is placed in the groove 128 of the body 106 to preclude any movement of the fixed jaw segment 172 axially of the body.

An assembly of a fixed jaw segment and a body of a chuck, similar to the assembly of the fixed jaw segment 172 and the body 106, is described in copending U.S. application Ser. No. 60/144,826, filed on Jul. 21, 1999, the disclosure of which is incorporated herein by reference thereto.

Referring to FIGS. 5 and 6, a compression member, such as a roller 186, is formed in the shape of a circular disk of a prescribed diameter and thickness, and is formed with an axial hole 188. A support, such as an axle pin 190, is placed and retained in the hole 188 of the roller 186 in such a manner that the pin is centrally located within the hole and extends axially from opposite major surfaces 192 and 194 of the roller.

The assembly of the roller 186 and the axle pin 190 is manipulated to place the roller into the slot 134 and the pin into the slot 130. The portion of the slot 134 which is contiguous with the axial opening 114 of the body 106 is of sufficient size to allow the roller 186 to pass, unimpeded, through the slot 134 and into the axial opening 114 of the body 106. However, the axle pin 190 engages and rests on the spaced shelves 136 and 138, each of which is a limit surface located at the base of the slot 130, to thereby limit any major portion of the roller from entering the axial opening of the body 106.

The radial distance between (1) the portion of the slot 134, which is contiguous with the axial opening 114, and (2) the spaced shelves 136 and 138 of the slot 130 is established in conjunction with the radius of the roller 186 to allow at least a portion of the roller to extend into the axial opening 114 when the axle pin 190 is in engagement with the spaced shelves. In addition, with reference to FIGS. 5 and 6, the springs 152 and 154 are placed in engagement with portions of the axle pin 190, which extend on opposite sides 192 and 194 of the roller 186, to urge the pin and the roller toward the forward end 124 of the body 106, and into a prescribed location at a forward position within the slot 134. The forward wall 144 and the rearward wall 146 of the slot 134 are spaced apart by a prescribed axial distance, which is sufficient to allow movement of the roller 186 axially of the body 106 within the slot 134.

As shown in FIG. 6, the roller 186 is located circumferentially by one-hundred and twenty degrees from each of the jaws 178, and generally in a plane which includes the jaws, to facilitate the clamping of the shank of a bit therebetween.

Figure 11:
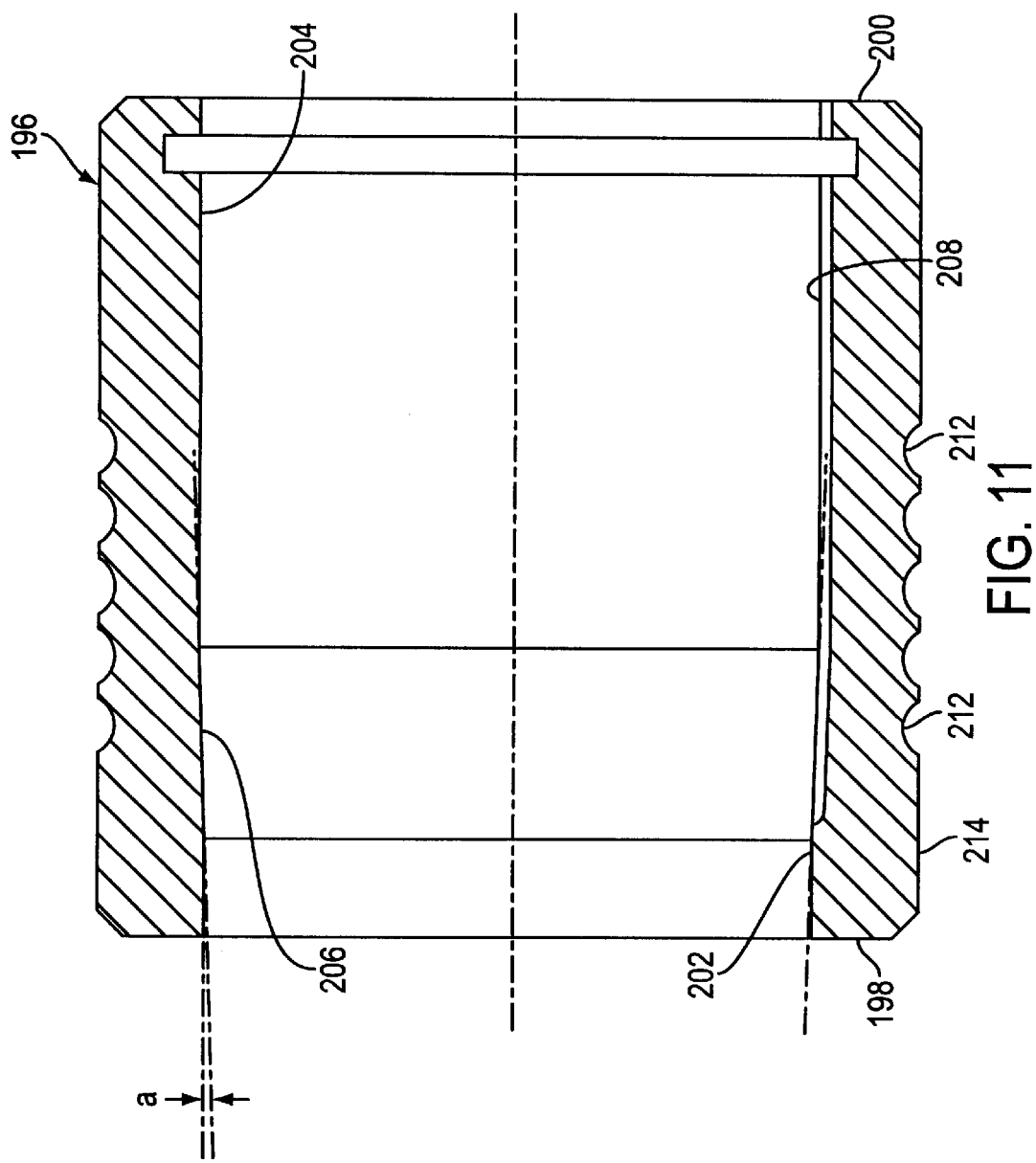
FIG. 11 is a sectional view showing a sleeve of the chuck of FIGS. 1 and 5, in accordance with certain principles of the invention.

Referring to FIGS. 1, 5 and 11, an actuator, such as a sleeve 196, is formed generally in a cylindrical configuration extending between a forward end 198 and an axially spaced rearward end 200. The sleeve 196 is formed with a forward inner wall 202 at a prescribed diameter, adjacent the forward end 198 thereof, and a rearward inner wall 204, at a diameter greater than the prescribed diameter of the forward inner wall 202. A pressure-applying surface of the sleeve 196 is formed by a sloping segment, such as a transition inner wall 206 of the sleeve, and extends between inboard ends of the forward inner wall 202 and the rearward inner wall 204 at a slope angle "a" (FIG. 11) of approximately three degrees.

A pair of circumferentially spaced, bearing grooves 208 (FIG. 6) are formed in the rearward inner wall 204 and the transition inner wall 206 of the sleeve 196, and extend from the rearward inner wall nearly to the forward inner wall 198, as shown in FIGS. 5 and 11. An annular retaining groove 210 is formed in the rearward inner wall 204 near the rearward end 200 of the sleeve 196. A plurality of spaced annular grooves 212 are formed in an exterior surface 214 of the sleeve 196, and provide a sensory pattern in the exterior surface to assist in selective movement of the sleeve by a user of the chuck 30.

When preparing to assemble the sleeve 196 with the body 106, bearing elements, such as a pair of bearing balls 216 (one shown), are placed in respective ones of the grooves 208 of the sleeve 196. The rearward end 198 of the sleeve 196 is placed adjacent the forward end 124 of the body 106, in axial alignment with the body. The sleeve 196 is then moved over the body 106 whereby each of the balls 216 locate in the respective groove 168 or 170 of the body, and move to a rear wall 218 of the respective grooves. Eventually, each of the balls 216 move to a forward wall 220 of the respective groove 208, whereby each ball is effectively captured between the respective set of the rear walls 218 and the forward walls 220.

A compression spring 222 is then placed over the rear section 112 of the body 106 and a retaining ring 224 is placed into the annular retaining groove 210 of the body. The spring 222 is captured between the ring 224 and a shoulder wall 226, formed at the junction of the intermediate section 110 and the rear section 112 of the body 106, and normally urges the sleeve 196 axially to the rear of the chuck 30. In the assembled state, a forward end 228 of the transition inner wall 206 of the sleeve 196 is located at a juncture of the transition inner wall and the forward inner wall 202, and is the closest portion of the sloping segment to the axis 113 of the body 106. Also, a portion of the roller 186 extends from the slot 134 into the axial opening 114 of the body 106.

The chuck 30 is now ready for use to locate and clamp portions of a shank of a bit within the chuck. In this use-ready condition, the roller 186 is normally urged, by the springs 152 and 154, into a prescribed location within the slot 134, that is toward the forward end 124 of the body 106. A user inserts a round shank 228 of a bit 230 (FIG. 5), for example, into the axial opening 114 of the body 106 to locate the shank on the jaws 178 and to move the shank toward the rear of the axial opening. Just after the shank 228 is moved into the opening 114, the free end of the shank engages the portion of the roller 186, which extends normally into the axial opening 114 of the body 106, and urges the roller rearward within the slot 134 against the biasing action of the springs 152 and 154.

As the bit 230 is moved rearward, the roller 186 is moved along the sloped transition inner wall 206 of the sleeve 196, that is the pressure-applying surface, and further upward into the slot 134, in a radially-outward position, until the free end of the shank 228 passes the any contact with the roller. The roller 186 then rides on the peripheral side surface of the shank 228 while remaining in the radially-outward position, and the springs 152 and 154 urge the roller forward in the slot 134 whereby the roller eventually becomes wedged between the side surface of the shank and the pressure-applying surface of the transition inner wall 206. Eventually, the free end of the shank 228 reaches the floor of the axial bore 116, and the shank is clamped between the compression member, that is the roller 186, and the jaws 178 of the jaw segment 172, whereby the bit 230 is clamped with to the chuck 30. As shown in FIGS. 5 and 6, when the roller 186 is moved to the radially-outward position, the axle pin 190.is moved radially outward also so that the pin is spaced from the shelves 136 and 138 during the period when the shank 228 is clamped within the chuck 30, thereby allowing for radially-inward compressing movement of the roller.

When the user wishes to remove the bit 230 from the chuck 30, the sleeve 196 is gripped by the user, in the area of the sensory pattern of the annular grooves 212 if desired, and the sleeve is moved forward, against the biasing action of the spring 222 toward the forward end 124 of the body 106. As the sleeve 196 is moved forward, the pressure-applying surface formed by the transition inner wall 206 is also moved forward of its compressing engagement with the roller 186. This action relieves the compressing force which is applied to the roller 186, and allows the roller to be moved slightly radially, whereby the clamping of the shank 228 is relaxed and the bit 230 can be removed from the chuck 30. Also, the bearing balls 216 glide within the respective grooves 208 of the sleeve 196 to provide a rolling relative support for the body 106 and the sleeve.

Figure 13:
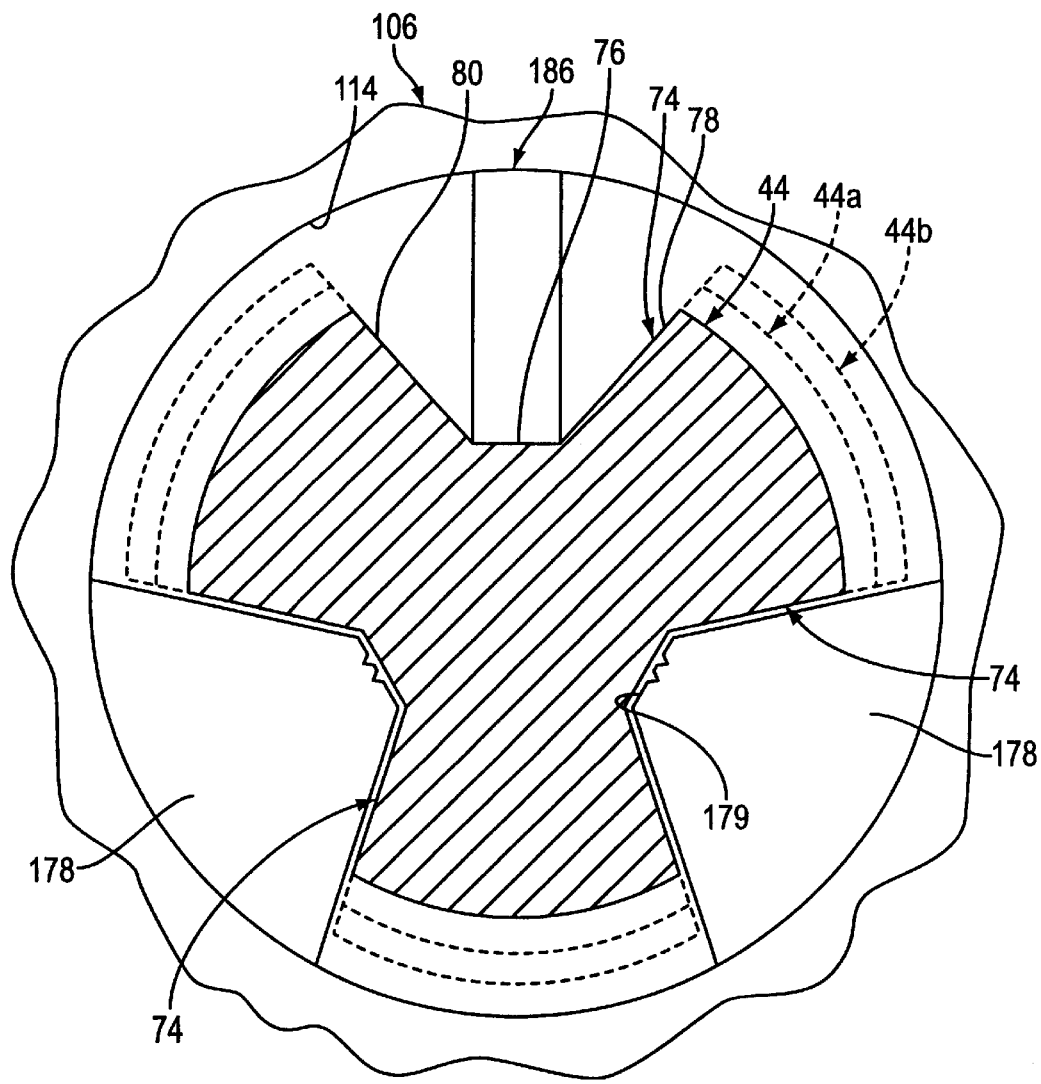
FIG. 13 is a schematical representation of an assembly of a chuck with any of several bits having different shank diameters, in accordance with certain principles of the invention.

As shown in FIG. 6, the arrangement of the jaws 178 and the roller 186 will accommodate bits 34, bits 38 and bits 47 having shanks with hex, round and triangular cross sections, respectively. In addition, as shown in FIG. 13, the arrangement of the jaws 178 and the roller 186 will accommodate bits with grooved shanks such as, for example, bits 42 (FIG. 2), bits 44 (FIGS. 3 and 13) and bits 46, generally in the manner described in the above-mentioned copending U.S. application Ser. No. 09/439,505, filed on Nov. 12, 1999.

Further, as shown in FIG. 13, the arrangement of the jaws 178 and the roller 186 will accommodate bits having shanks of different diameters. For example, bit 44, which is shown in solid, depicts a bit having a shank with a prescribed diameter. Bits 44a and 44b are shown in dashed lines, and represent bits having shanks with diameters which are successively greater than the prescribed diameter. Each of the bits 44, 44a and 44b is formed with a shank having a diameter which is different from the diameters of the shanks of the remaining two bits. However, the shank of each the bit 44, 44a and 44b is formed with grooves 74, each being formed with the flat floor 76 which is located a common radial distance from the axis of the respective bit. Thus, the floor 76 of the grooves 74 of a given bit will be spaced from the axis of the given bit by a radial distance which is the same as the radial distance between the floor 76 and the axis of any other bit, even though the diameter of the other bit is different from the diameter of the given bit.

FIGS. 14 through 22 illustrate features of a preferred embodiment of a chuck 232 (FIG. 14), and an assembly of the preferred embodiment of the chuck with bits such as, for example, the hex bit 34, the round bits 38 and 230, the grooved bits 42, 44 and 46, and the triangular bit 47. Some of the features of the chuck 232 are similar to the features of the chuck 30. Such similar features will be described only as they relate to features of the chuck 232 which are not similar to the features of the chuck 30, it being understood that the features of the chuck 232 which are not described function in a manner similar to function of the corresponding features described above with respect to the chuck 30. Further, it is to be understood that the structure of the chuck 232 provides the same relationship with the shanks and bits as described above with respect to the chuck 30.

Figure 14:
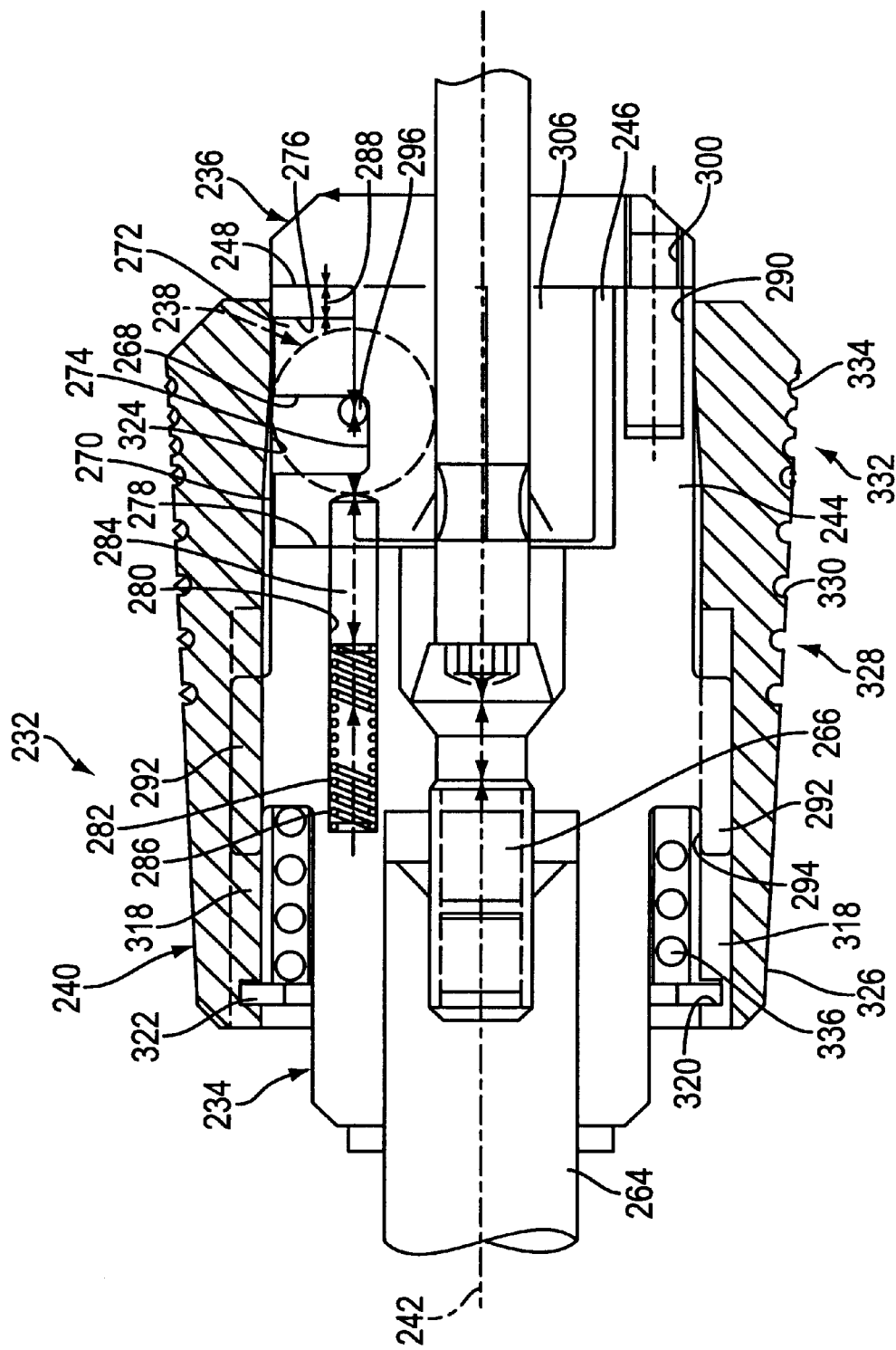
FIG. 14 is a sectional view showing a second embodiment of a chuck, in accordance with certain principles of the invention.
Figure 16:
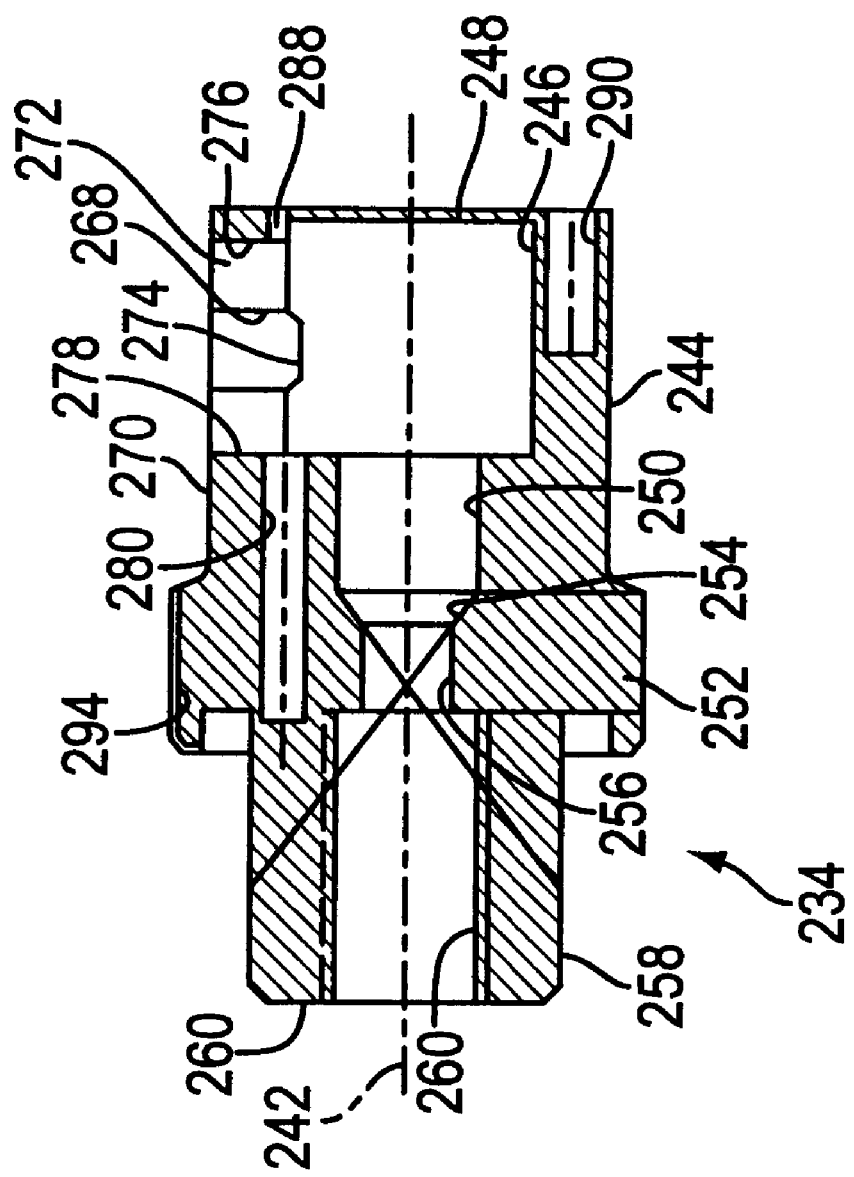
FIG. 16 is a sectional view showing a body of the chuck of FIG. 14, in accordance with certain principles of the invention.
Figure 17:
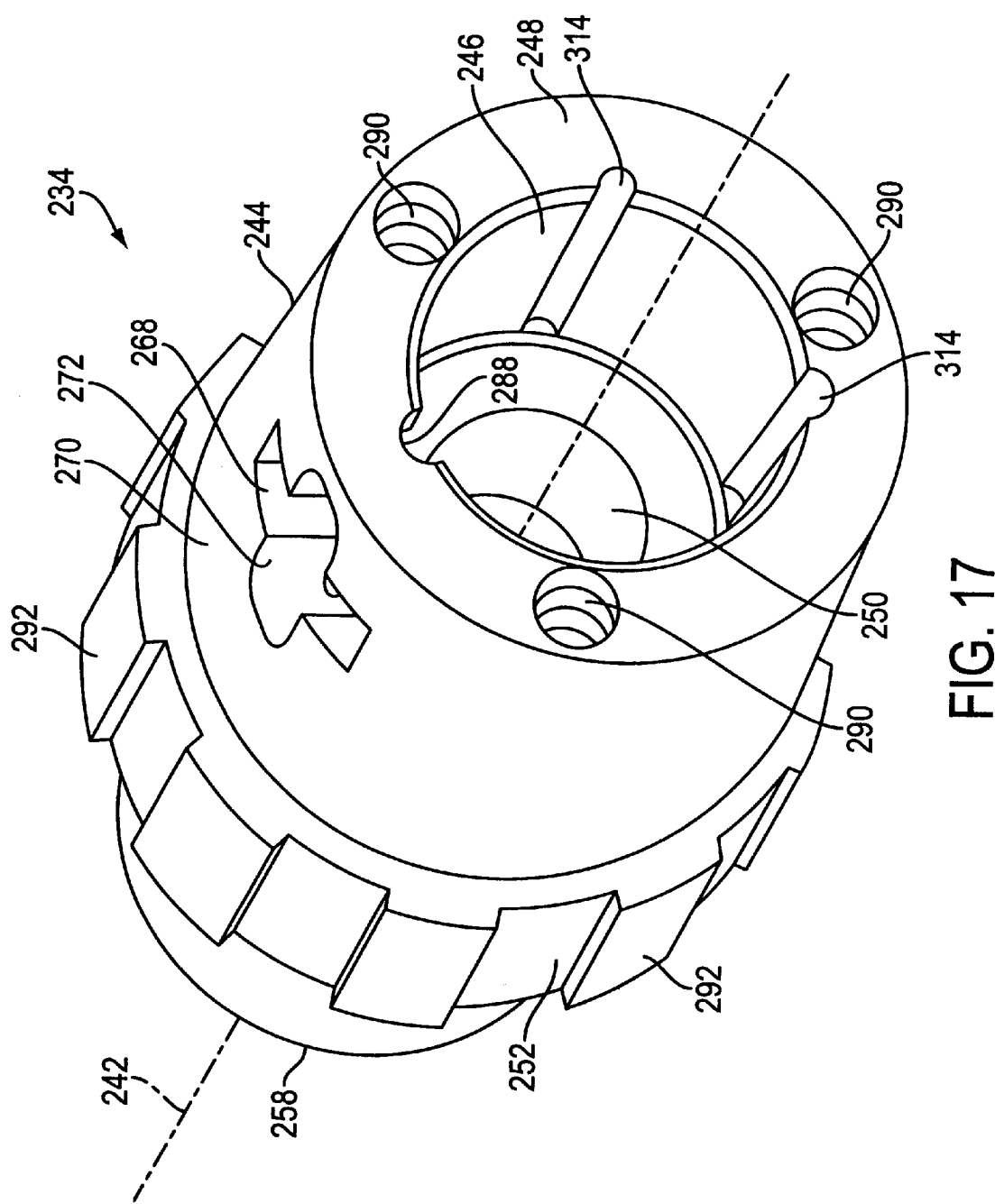
FIG. 17 is a perspective view showing the body of FIG. 16, in accordance with certain principles of the invention.

Referring to FIG. 14, the chuck 232 includes a body 234, a nosepiece 236, a roller 238 and a sleeve 240. As shown in FIGS. 16 and 17, the body 234 is formed along an axis 242 thereof and includes a forward section 244 which is formed with an axial opening or bore 246, accessible from a forward end 248 of the body, and a smaller axial bore 250 formed to the rear of the forward section. An intermediate section 252 of the body 234 is formed with an axial counter sunk section 254 and a smaller axial bore 256. A rear section 258 of the body 234, which extends to a rear end 260 of the body, is formed with an axial bore 262 which may be threaded to receive a threaded spindle 264 (FIG. 14) which extends from a forward end of the drill 32 (FIG. 1), to facilitate securance of the chuck 232 with the drill 32. The bores 246, 250, 256 and 262, and the counter sunk section 254, are aligned axially, and are in communication with each other. A threaded bolt 266 (FIG. 14) is insertable from the forward end 248 of the body 234, and is threadedly mounted into a threaded bore formed in a forward end of the spindle 264 to further facilitate the securance of the chuck 232 with the drill 32. The threads of the spindle 264 and the body 234, which facilitate securance therebetween, are left-hand threads, while the threads of the spindle 264 and the bolt 266, which facilitate securance therebetween, are right-hand threads.

As shown in FIG. 17, a first slot 268, or circumferential passage, is formed in a first exterior surface portion 270 of the forward section 244 of the body 234, and is transverse to the axis 242 of the body. A second slot 272, or radial passage, is formed in an axial direction in the first exterior surface portion 270 of the forward section 244 of the body 234, and is parallel to the axis 242 of the body. The slots 268 and 272 are arranged in a cross pattern and, as shown in FIG. 17, are in communication with each other and with the axial opening 246.

As shown in FIG. 16, a pair of spaced shelves 274 (one shown), or limit surfaces, are located in a common plane, and are formed on transaxially spaced sides of a base of the slot 268. The slot 272 is formed with a forward wall 276, adjacent the forward end 248 of the body 234, and a rearward wall 278, axially opposite the forward wall, which are spaced apart by a prescribed axial distance.

A hole 280 is formed in the body 234 to the rear of the slot 272 for eventual full receipt of a spring 282 (FIG. 14), and partial receipt of a slug 284 (FIG. 14), a forward portion of the slug extending axially from the hole and into the slot. The hole 280 is open at a forward end thereof, which is in communication with the slot 272, and is formed with a floor 286 at a second end spaced rearward of the body 234 from the first end. Referring to FIGS. 14, 16 and 17, to facilitate insertion of the spring 282 into the hole 280, a clearance hole 288 is formed through the forward end 248 of the body 234. Thereafter, the slug 284 is inserted into the hole 280, somewhat to the extent shown in FIG. 14. With this arrangement, the spring 282 is contained within a generally clean environment at all times, including periods when the chuck 232 is being used.

As shown in FIGS. 14, 16 and 17, three threaded holes 290 are formed in the forward end 248 of the body 234, and a plurality of splines 292 are formed about the periphery of the intermediate section 252 of the body. A rear portion of the intermediate section 252 of the body 234 is formed with a circumferential well 294, which faces rearward of the body and overhangs slightly a forward peripheral wall portion of the rear section 258.

Figure 15:
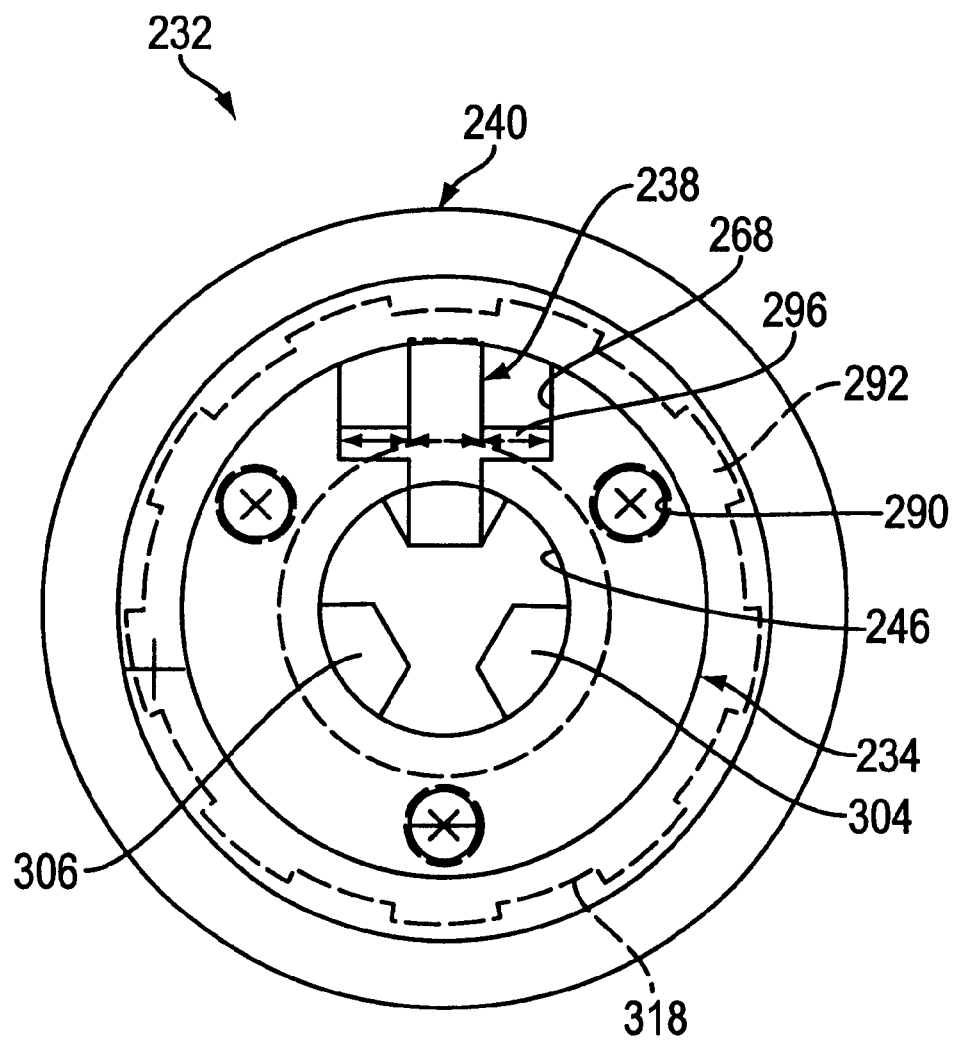
FIG. 15 is an end view showing the chuck of FIG. 14, in accordance with certain principles of the invention.

Referring to FIGS. 14 and 15, an axle pin 296 is assembled within an axial hole of the roller 238 in the same manner as the axle pin 190 (FIG. 5) in its assembly with the roller 186. The roller 238 is positioned into the slot 272, with the axle pin 296 being located in the slot 268. The roller 238 and the axle pin 296 function in the same manner as the roller 186 and the axle pin 190, and will not be described further, except as the roller may relate to other features of the preferred embodiment of the chuck 232.

Figure 18:
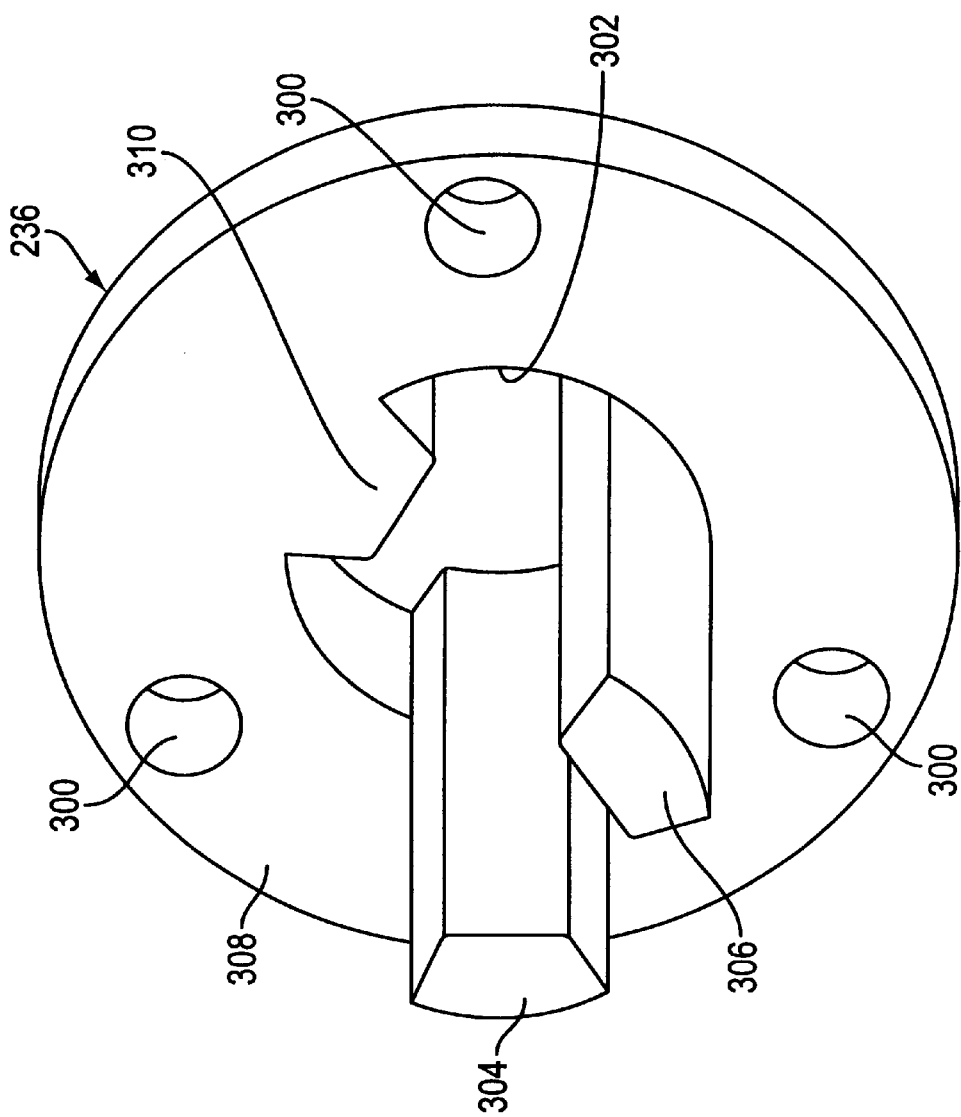
FIG. 18 is a perspective view showing a nosepiece and integrally formed jaws in accordance with certain principles of the invention.
Figure 19:
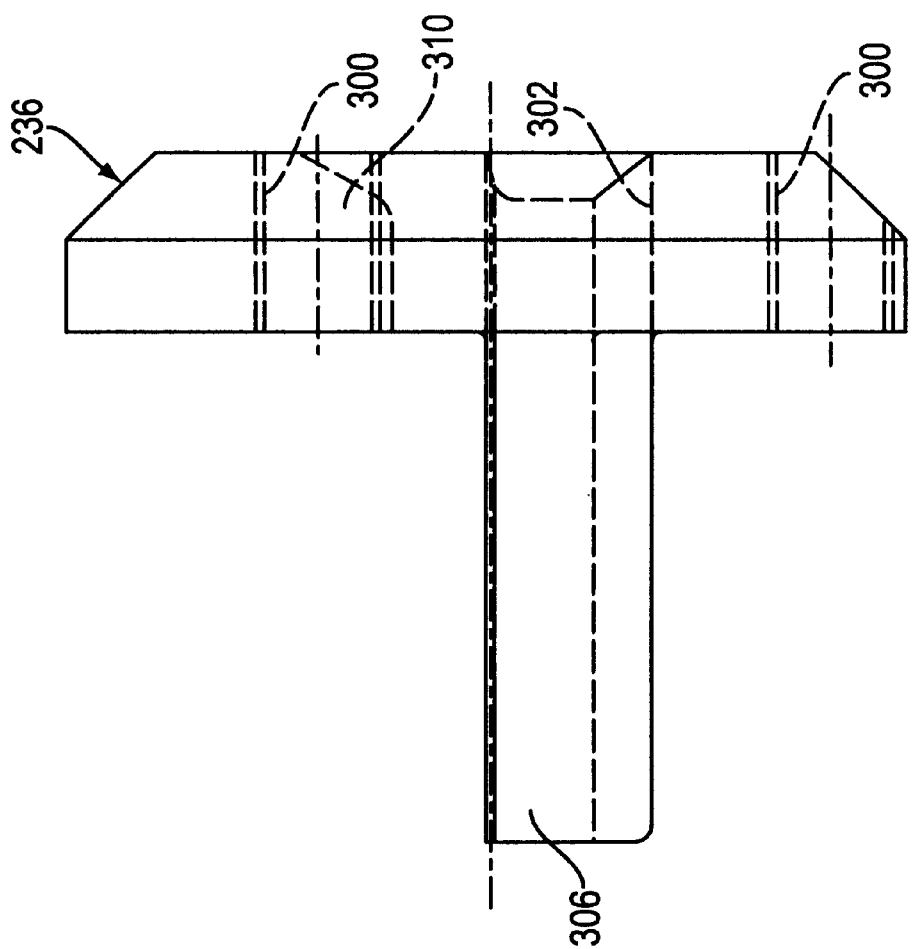
FIG. 19 is a side view showing the nosepiece and jaws of FIG. 18, in accordance with certain principles of the invention.
Figure 20:
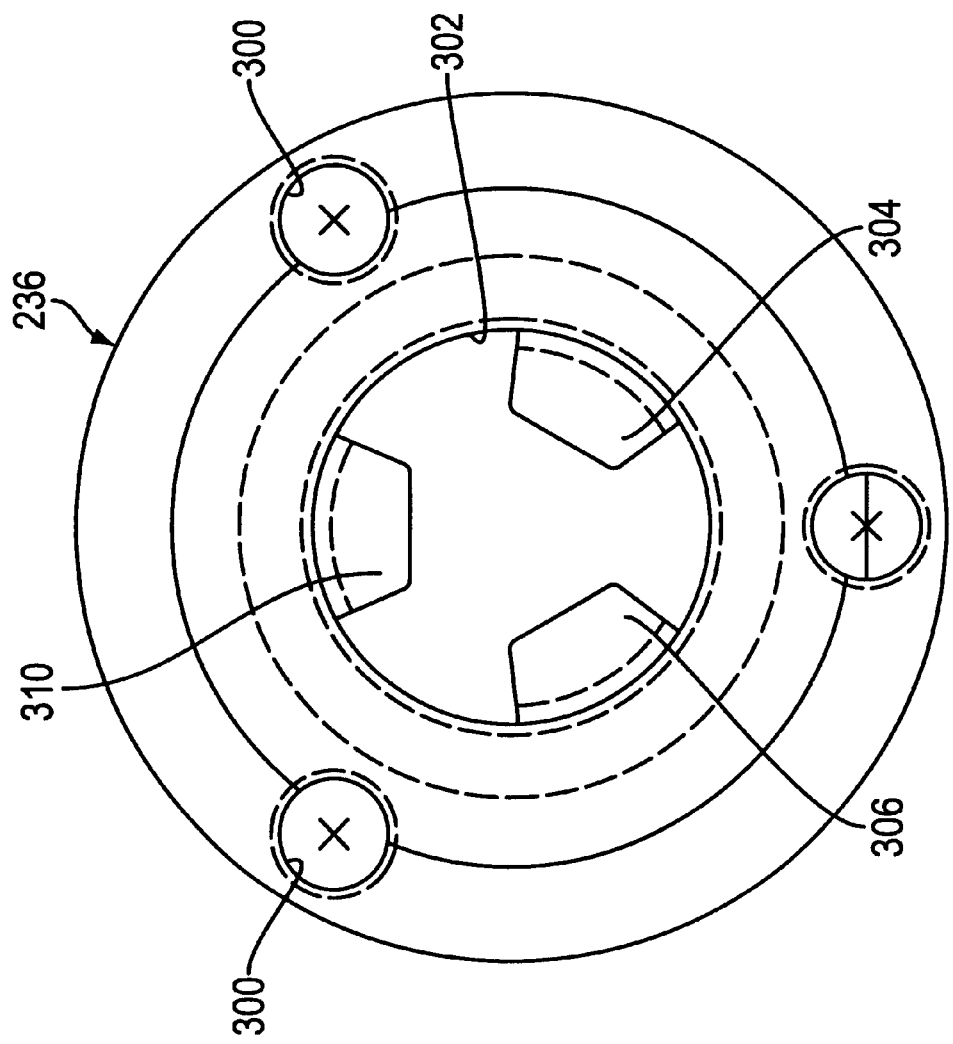
FIG. 20 is an end view of the nosepiece and jaws of FIG. 18, in accordance with certain principles of the invention.

Referring to FIGS. 18, 19 and 20, the nosepiece 236 is formed in the shape of a circular plate. The nosepiece 236 is formed with three equally spaced through holes 300, located near the periphery thereof, and an axial hole 302, which also extends through the plate. A pair of spaced jaws 304 and 306 are formed integrally with the nosepiece 236, within an inner wall of the hole 302, and extend axially from a rear side 308 of the nosepiece 236. A third or short jaw 310 is formed integrally with the nosepiece 236 and is located totally in the plane of the nosepiece. The jaws 304, 306 and 310 are spaced angularly from each other by one-hundred and twenty degrees.

Referring to FIG. 14, when assembling the nosepiece in the formation of the elements of the chuck 232, the rear side 308 is placed adjacent the forward end 248 of the body 234, with holes 300 aligned with the threaded holes 290 of the body and with the short jaw 310 being aligned with the roller 238. Threaded fasteners (not shown) are then placed through the holes 300 and threadedly in the holes 290 to secure the nosepiece 236 with the body 234. In this manner, the jaws 304 and 306 are located in a position similar to the position of the jaws 178 in the above-described chuck 30. The short jaw 310, together with the portions of the jaws 304 and 306 which are located in the plane of the nosepiece, provide a lead-in guide for any bit inserted into the axial opening 246 of the body 234.

Figure 21:
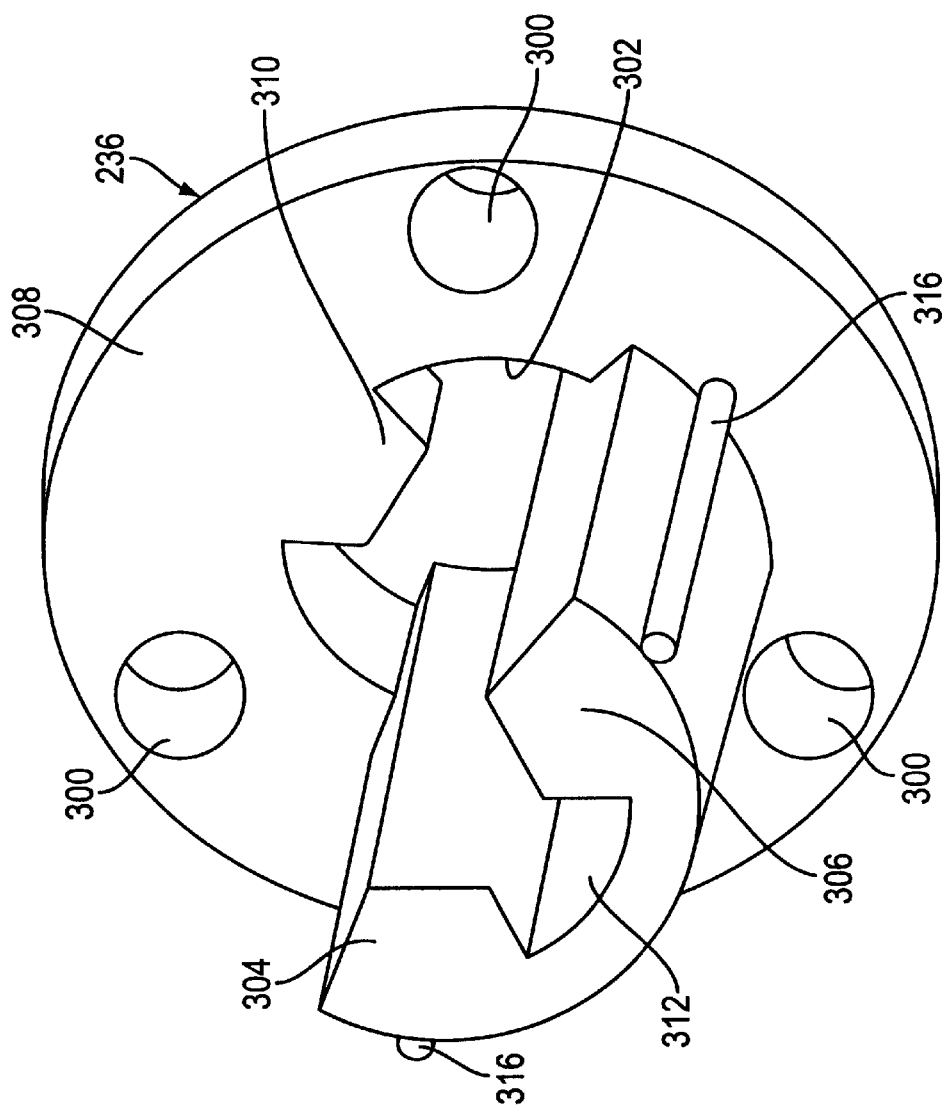
FIG. 21 is a perspective view showing a nosepiece and jaws having structure in addition to the structure of the nose piece and jaws of FIGS. 18, 19 and 20, in accordance with certain principles of the invention.

As further shown in FIG. 21, a web 312 is formed between adjacent portions of interfacing side walls of the jaws 304 and 306, and provide additional strengthening support for the jaws. Also, as shown in FIG. 17, a pair of axially directed grooves 314 can be formed in the inner wall of the body 234, and are located to receive guide rails 316 formed on an outside surface of the jaws 304 and 306. The grooves 314 and the rails 316 cooperate to locate the nosepiece 236 and the jaws 304, 306 and 310 properly with respect to the body 234.

Figure 22:
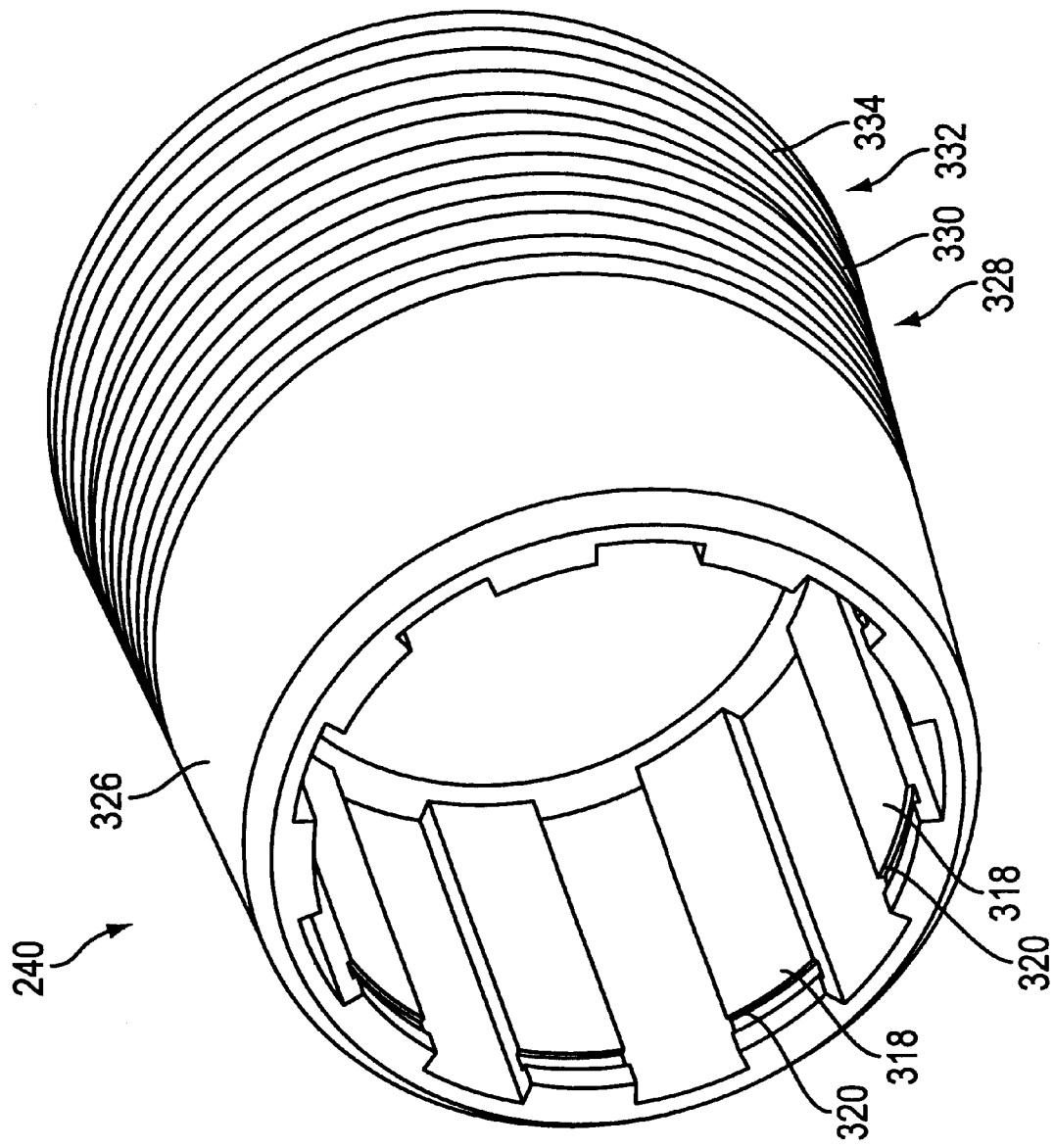
FIG. 22 is a perspective view showing a sleeve of the chuck of FIG. 14, in accordance with certain principles of the invention.

As shown in FIGS. 14 and 22, the sleeve 240 is formed with splines 318 which are arranged to mate complementarily with the splines 292 (FIG. 17) of the body 234 when the sleeve is positioned over the body. Each of the splines 318 is formed with a transverse groove 320, all of which are aligned in a circular path for eventual receipt of a retaining ring 322 (FIG. 14). The complementary arrangement of the splines 292 and 318 allow relative axial movement between the body 234 and the sleeve 240, and preclude movement in a direction laterally of the axis of the body.

Referring to FIG. 14, a transition inner wall 324 of the sleeve 240 is tapered radially inward from the rear to the front of the transition inner wall, and serves as the pressure-applying surface for the roller 238, that is, the compression member, in the manner described above with respect to the transition inner wall 206.

Referring to FIG. 14 and 22, an outer or exterior surface 326 of the sleeve 240 is tapered radially outward from a rear end to a forward end of the sleeve, and provides a ramp-like effect to assist the user when moving the sleeve to a forward position of the chuck 232. In addition, a first sensory pattern 328 is formed in the exterior surface 326 of the sleeve 240, and includes a plurality of annular grooves 330 spaced apart by a prescribed distance. A second sensory pattern 332 is formed in the exterior surface 326 of the sleeve 240, spaced axially from the first sensory pattern 328. The second sensory pattern 332 is formed by a plurality of annular grooves 334 spaced apart by a distance less than the prescribed distance, and is located closer to the forward end of the sleeve 240 than the location of the first sensory pattern 328. The first and second sensory patterns 328 and 332 provide further assistance to the user when manipulating the sleeve 240 relative to the body 234.

Referring to FIG. 14, the forward end of the sleeve 240 is moved over the rear end of the body 234 and the splines 292 and 318 are complementarily engaged, and the sleeve is moved to a generally forward position relative to the body. A compression spring 336 is placed over the rear section 258 of the body 234, with a forward end of the spring being located in the well 294 of the body. The retaining ring 322 is then placed in the grooves 320 to complete the assembly of the components of the chuck 232.

A shank 338 of a bit 340 is inserted into the axial opening of the body 234 to the position shown in FIG. 14, in the same manner described above with respect to the bit 230. The shank 338 is thereby clamped between the jaws 304 and 306 and the roller 238, in the same manner described above. When the user wishes to extract the bit 340, the user moves the sleeve 240 forward of the body 234 against the biasing action of the spring 336 to relax the compression of the roller 238, whereafter the bit can be extracted.

What is claimed is:

1. A chuck for receiving and supporting a bit, which comprises:
    a body formed along an axis thereof having an axial opening accessible from a forward end of the body for receipt of a shank of the bit;
    a radial passage formed in the body in communication with the axial opening within the body;
    a limit surface formed on the body adjacent the radial passage;
    a compression member located for movement axially of the body within the radial passage and having at least a portion which is extendable from the radial passage into the axial opening; and
    a support extending from the compression member and positioned for engagement with the limit surface to limit the extent of movement of the at least a portion of the compression member into the axial opening.

2. The chuck as set forth in claim 1, which further comprises:
    the size and shape of the radial passage being sufficient to allow the compression member to pass unimpeded through the radial passage and into the axial opening.

3. The chuck as set forth in claim 1, which further comprises:
    a biasing element for urging the support and the compression member toward the forward end of the body and into a prescribed location within the radial passage.

4. The chuck as set forth in claim 3, wherein the biasing element is in engagement with the support to urge the support and the compression member toward the forward end of the body and into the prescribed location.

5. The chuck as set forth in claim 3, wherein the biasing element is positioned to apply an urging force to the compression member to urge the compression member with the support into the prescribed location.

6. A chuck for receiving and supporting a bit, which comprises:
    a body formed along an axis thereof having an axial opening accessible from a forward end of the body for receipt of a shank of the bit;
    a radial passage formed in the body in communication with the axial opening within the body;
    a limit surface formed on the body adjacent the radial passage;
    a compression member located movably within the radial passage and having at least a portion which is extendable from the radial passage into the axial opening;
    a support extending from the compression member and positioned for engagement with the limit surface to limit the extent of movement of the at least a portion of the compression member into the axial opening;
    the radial passage formed with a forward wall, adjacent the forward end of the body, and a rearward wall axially opposite the forward wall; and
    the forward wall and the rearward wall being spaced apart by a distance sufficient to allow movement of the compression member axially of the body.

7. The chuck as set forth in claim 1, which further comprises:
    an actuator mounted on the body for movement relative to the body; and
    a pressure-applying surface formed on the actuator and located for engagement with the compression member when the actuator is in a prescribed position relative to the body.

8. The chuck as set forth in claim 7, which further comprises;

the pressure-applying surface extending in an axial direction from a forward end thereof, which is adjacent the forward end of the body, to a rearward end thereof and is formed with a sloping segment which is closest to the axis of the body at the forward end of the surface.

9. The chuck as set forth in claim 1, which further comprises:

a fixed jaw segment located within the axial opening of the body in a position spaced from the compression member for locating and clamping portions of the shank of the bit therebetween.

10. A chuck for receiving and supporting a bit, which comprises:

a body formed along an axis thereof having an axial opening accessible from a forward end of the body for receipt of a shank of the bit;

a radial passage formed in the body in communication with the axial opening within the body;

a limit surface formed on the body adjacent the radial passage;

a compression member located movably within the radial passage and having at least a portion which is extendable from the radial passage into the axial opening;

a support extending from the compression member and positioned for engagement with the limit surface to limit the extent of movement of the at least a portion of the compression member into the axial opening;

a fixed jaw segment located within the axial opening of the body in a position spaced from the compression member for locating and clamping portions of the shank of the bit therebetween;

wherein an outer surface of the shank of the bit is formed with at least a first axially extending groove and a second axially extending groove which are spaced circumferentially about the shank;

a jaw formed in an axial direction on the fixed jaw segment extending radially toward the axis, and located within the opening, of the body;

the jaw being formed to locate within the first groove of the shank of the bit when the bit is inserted into the opening of the body; and the compression member being located in the body to locate in the second groove of the shank of the bit when the shank is inserted into the opening of the body and the jaw is being located in the first groove.

11. The chuck as set forth in claim 9, which further comprises:

a jaw formed in an axial direction on the fixed jaw segment extending radially toward the axis, and located within the opening, of the body.

12. The chuck as set forth in claim 1, which further comprises:

a circumferential passage formed in the body in communication with the radial passage; and the circumferential passage formed with a shelf adjacent the radial passage which forms the limit surface of the body.

13. A chuck for receiving and supporting a bit, which comprises:

a body formed along an axis thereof having an axial opening accessible from a forward end of the body for receipt of a shank of the bit;

a radial passage formed in the body in communication with the axial opening within the body;

a limit surface formed on the body adjacent the radial passage;

a compression member located movably within the radial passage and having at least a portion which is extendable from the radial passage into the axial opening;

a support extending from the compression member and positioned for engagement with the limit surface to limit the extent of movement of the at least a portion of the compression member into the axial opening;

an actuator located on the body and movable relative thereto; and at least one bearing element located between opposing surfaces of the body and the actuator for facilitating relative movement between the body and the actuator.

14. The chuck as set forth in claim 13, which further comprises:

the compression member being in bearing contact with the actuator at a location spaced from the at least one bearing element to further facilitate relative movement between the body and the actuator.

15. The chuck as set forth in claim 1, wherein the compression member is a roller.

16. The chuck as set forth in claim 1, wherein the support is an axle pin which extends from, and along an axis of, the compression member.

17. A chuck for receiving and supporting a bit, which comprises:

a body formed along an axis thereof having an axial opening accessible from a forward end of the body for receipt of a shank of the bit;

a radial passage formed in the body in communication with the axial opening within the body;

a limit surface formed on the body adjacent the radial passage;

a compression member located movably within the radial passage and having at least a portion which is extendable from the radial passage into the axial opening;

a support extending from the compression member and positioned for engagement with the limit surface to limit the extent of movement of the at least a portion of the compression member into the axial opening;

a nosepiece attached to the forward end of the body; and at least one jaw extending from a rear face of the nosepiece in a direction axially toward a rear end of the body and located in the opening of the body.

18. The chuck as set forth in claim 17, which further comprises:

the at least one jaw being spaced circumferentially from the compression member to facilitate compressive clamping of the shank of the bit between the compression member and the at least one jaw.

19. A chuck for receiving and supporting a bit, which comprises:

a body formed along an axis thereof having an axial opening accessible from a forward end of the body for receipt of a shank of the bit;

a radial passage formed in the body in communication with the axial opening within the body;

a limit surface formed on the body adjacent the radial passage;

a compression member located movably within the radial passage and having at least a portion which is extendable from the radial passage into the axial opening;

a support extending from the compression member and positioned for engagement with the limit surface to limit the extent of movement of the at least a portion of the compression member into the axial opening;

a nosepiece attached to the forward end of the body; and a pair of spaced jaws extending from a rear face of the nosepiece in a direction axially toward a rear end of the body and located in the opening of the body.

20. The chuck as set forth in claim 19, which further comprises:

a web formed between the pair of spaced jaws.

21. The chuck as set forth in claim 17, which further comprises:

a wall formed about the opening of the body;

a groove formed in the wall of the opening; and a rail formed on the at least one jaw and structured to locate in the groove of the opening of the body upon attachment of the nosepiece with the body.

22. The chuck as set forth in claim 1, which further comprises:

an actuator located on the body and movable relative thereto;

the actuator being formed with an inner surface which interfaces with an outer surface formed on the body; and the inner surface and the outer surface being formed with complementary splines to allow relative axial movement between the body and the actuator and to preclude movement in a direction laterally of the axis of the body.

23. The chuck as set forth in claim 1, wherein the radial passage is a first radial passage, the limit surface is a first limit surface, the compression member is a first compression member and the support is a first support, which further comprises:

a second radial passage formed in the body in communication with the axial opening within the body spaced circumferentially from the first radial passage, a second limit surface formed on the body adjacent the second radial passage;

a second compression member located movably within the second radial passage and having a portion which is extendable into the axial opening; and a second support extending from the second compression member and positioned for engagement with the second limit surface to limit the extent of movement of the portion of the second compression member into the axial opening.

24. A chuck for receiving and supporting a bit, which comprises:

a body formed along an axis thereof and having an axial opening for receipt of a shank of the bit, with the opening being accessible from a forward end of the body;

a compression member located movably in the body and having at least a portion which is extendable into the axial opening;

a nosepiece attached to the forward end of the body; and at least one jaw extending from a rear face of the nosepiece in a direction axially toward a rear end of the body and located in the opening of the body.

25. The chuck as set forth in claim 24, wherein the at least one jaw is formed integrally with the nosepiece.

26. The chuck as set forth in claim 24, which further comprises;

the at least one jaw being spaced circumferentially from the compression member to facilitate compressive clamping of the shank of the bit between the compression member and the at least one jaw.

27. The chuck as set forth in claim 24, wherein the at least one jaw is a first jaw, which further comprises:

a second jaw spaced from the first jaw and extending from the rear face of the nosepiece in a direction axially toward the rear end of the body and located in the opening of the body.

28. The chuck as set forth in claim 27, wherein the first jaw and the second jaw are formed integrally with the nosepiece.

29. The chuck as set forth in claim 27, wherein the first jaw, the second jaw and the compression member are spaced circumferentially from each other to facilitate compressive clamping of the shank of the bit at spaced locations of the shank.

30. The chuck as set forth in claim 27, which further comprises:

a web formed between the first jaw and the second jaw.

31. The chuck as set forth in claim 24, which further comprises:

the axial opening of the body formed with an inner wall;

a groove formed in the inner wall of the axial opening; and a rail formed on the at least one jaw and structured to be received within the groove upon assembly of the nosepiece with the body.

32. The chuck as set forth in claim 24, which further comprises:

a hole formed in the body having an opening at a first end thereof adjacent the location of the compression member and a floor at a second end spaced rearward of the body from the first end of the hole;

a biasing element located in the hole; and a slug located partially within the hole to confine the biasing element fully within the hole and having a first end in engagement with the biasing element and a second end positioned to urge the compression member toward the forward end of the body.

33. The chuck as set forth in claim 24, which further comprises:

a radial passage formed in the body in communication with the axial opening within the body;

the compression member located movably within the radial passage and having at least a portion which is extendable from the radial passage into the axial opening.

34. The chuck as set forth in claim 33, which further comprises:

a limit surface formed on the body adjacent the radial passage;

a support extending from the compression member and positioned for engagement with the limit surface to limit the extent of movement of the at least a portion of the compression member into the axial opening.

35. The chuck as set forth in claim 24, wherein the compression member is a first compression member, which further comprises:

a second compression member located movably in the body and having a portion which is extendable into the axial opening.

36. The chuck as set forth in claim 35, which further comprises:

the first compression member, the second compression member and the at least one jaw being spaced circumferentially from each other.

37. The chuck as set forth in claim 24, which further comprises:

the nosepiece being formed in a plane thereof with an axial opening therethrough having an inner wall; and at least one nosepiece jaw formed on the inner wall of the opening in the plane of the nosepiece and extending radially inward of the nosepiece opening.

38. The chuck as set forth in claim 37, which further comprises:

the at least one nosepiece jaw being in alignment with the compression member axially of the body.

39. The chuck as set forth in claim 24, which further comprises:

an actuator mounted on the body for movement relative to the body; and a pressure-applying surface formed on the actuator and located for engagement with the compression member when the actuator is in a prescribed position relative to the body.

40. The chuck as set forth in claim 24, which further comprises:

an actuator mounted on the body for movement relative to the body and formed with a forward end, adjacent the forward end of the body, and a rear end spaced from the forward end of the actuator;

the actuator being formed with an exterior surface at least a portion of which tapers outward in a direction from the rear end toward the forward end of the actuator;

a first sensory pattern formed in the exterior surface of the actuator;

a second sensory pattern, which is different from the first sensory pattern, formed in the exterior of the surface of the actuator; and the first sensory pattern being located closer to the forward end of the actuator than the second sensory pattern.

41. The chuck as set forth in claim 24, which further comprises:

an actuator mounted on the body for movement relative to the body;

the body formed with an exterior surface which interfaces with an interior surface formed on the actuator; and the exterior surface of the body and the interior surface of the actuator being formed with complementary splines to allow relative axial movement between the body and the actuator and to preclude relative movement therebetween in a direction laterally of the axis of the body.

42. The chuck as set forth in claim 24, which further comprises:

a radial passage formed in the body in communication with the axial opening within the body;

a circumferential passage formed in the body in communication with the radial passage;

a limit surface formed by the circumferential passage on the body adjacent the radial passage;

the compression member located movably within the radial passage; and a support extending from the compression member and positioned for engagement with the limit surface to limit the extent of movement of the at least a portion of the compression member into the axial opening.

43. A chuck and bit assembly, which comprises:

a chuck comprising:

a body formed along an axis thereof and having an axial opening for receipt of a shank of the bit, with the opening being accessible from a forward end of the body;

a jaw located within the opening of the body in an axial direction thereof;

a radial passage formed in the body in communication with the axial opening within the body;

a limit surface formed on the body adjacent the radial passage;

a compression member located movably within the radial passage and having at least an extendable portion which is extendable into the axial opening;

a support extending from the compression member and positioned for engagement with the limit surface to limit the extent of movement of the extendable portion of the compression member into the axial opening; and means for urging the extendable portion of the compression member toward the axis of the body; and a bit comprising:

a chuck-mountable shank formed along an axis thereof;

the shank formed with spaced exterior surface areas positionable adjacent the extendable portion of the compression member and the at least one jaw upon positioning of the shank within the axial opening of the body;

wherein the means for urging facilitates the clamping of the shank between the compression member and the jaw.

44. The chuck and bit assembly as set forth in claim 43, which further comprises:

an inner wall formed about the axial opening of the body;

the at least one jaw extending away from the inner wall of the axial opening of the body to a ridge of the jaw which is the area of the jaw closest to the axis of the body;

a first surface area of the spaced exterior surface areas of the shank being located in engagement with the ridge of the at least one jaw; and a second surface area of the spaced exterior surface areas of the shank being located for compressing engagement with the compression member to clamp the shank of the bit between the at least one jaw and the compression member.

45. The chuck and bit assembly as set forth in claim 44, which further comprises:

the ridge of the at least one jaw is rounded.

46. The chuck and bit assembly as set forth in claim 44, which further comprises:

the ridge of the at least one jaw is flat.

47. The chuck and bit assembly as set forth in claim 44, which further comprises:

the cross section of the shank of the bit is round.

48. The chuck and bit assembly as set forth in claim 44, which further comprises:

the cross section of the shank of the bit is hexagonal.

49. The chuck and bit assembly as set forth in claim 44, which further comprises:

the cross section of the shank of the bit is triangular.

50. The chuck and bit assembly as set forth in claim 44, which further comprises:

the shank of the bit extending axially from a free end to an intermediate portion of the bit;

at least a pair of spaced grooves formed axially in the shank and extending from the free end toward the intermediate portion of the bit;

the at least one jaw of the body being located in a first of the spaced grooves of the bit; and the compression member being located in a second of the spaced grooves of the bit.

51. The chuck and bit assembly as set forth in claim 50, which further comprises:

each of the at least a pair of spaced grooves of the bit formed with a floor and spaced opposed side walls in a prescribed cross sectional groove structure and with a prescribed groove depth.

52. The chuck and bit assembly as set forth in claim 51, which further comprises:

the at least one jaw of the chuck being formed with the ridge and opposite side walls extending from opposite side edges of the ridge toward the inner wall of the axial opening of the body;

the ridge and the opposite side walls formed with a cross sectional jaw structure complementary to the prescribed cross sectional groove structure and with a prescribed jaw height defined by the radial distance between the inner wall of the axial opening of the body and the ridge of the at least one jaw.

53. The chuck and bit assembly as set forth in claim 52, which further comprises:

the prescribed jaw height of the at least one jaw being greater than the prescribed groove depth.

54. The chuck and bit assembly as set forth in claim 52, which further comprises:

the prescribed jaw height of the at least one jaw being the same as the prescribed depth of the groove of the shank of the bit.

55. The chuck and bit assembly as set forth in claim 53, which further comprises:

the ridge of the at least one jaw being in engagement with the floor of the groove upon assembly of the bit with the chuck.

56. The chuck and bit assembly as set forth in claim 55, which further comprises:

the spaced opposed side walls of the at least a pair of grooves being in engagement with at least a portion of respective ones of the opposite side walls of the at least one jaw.

57. A chuck and bit assembly, which comprises:

a chuck comprising:

a body formed along an axis thereof and having an axial opening for receipt of a shank of the bit, with the opening being accessible from a forward end of the body;

a compression member located movably in the body and having at least an extendable portion which is extendable into the axial opening;

a nosepiece attached to the forward end of the body;

at least one jaw extending from a rear face of the nosepiece in a direction axially toward a rear end of the body and located in the opening of the body; and means for urging the extendable portion of the compression member toward the axis of the body; and a bit comprising:

a chuck-mountable shank formed along an axis thereof;

the shank formed with spaced exterior surface areas positionable adjacent the extendable portion of the compression member and the at least one jaw upon positioning of the shank within the axial opening of the body;

wherein the means for urging facilitates the clamping of the shank between the compression member and the jaw.

* * * * *